United States Patent
Fu et al.

(10) Patent No.: US 12,526,087 B2
(45) Date of Patent: Jan. 13, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhe Fu, Dongguan (CN); Jing Xu, Dongguan (CN); Zuomin Wu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 471 days.

(21) Appl. No.: 18/147,237

(22) Filed: Dec. 28, 2022

(65) Prior Publication Data
US 2023/0269035 A1    Aug. 24, 2023

Related U.S. Application Data

(63) Continuation of application No. PCT/CN2020/107458, filed on Aug. 6, 2020.

(51) Int. Cl.
*H04L 1/1829* (2023.01)
*H04L 1/1812* (2023.01)
*H04L 5/00* (2006.01)

(52) U.S. Cl.
CPC .......... *H04L 1/1854* (2013.01); *H04L 1/1812* (2013.01); *H04L 1/1861* (2013.01); *H04L 5/0055* (2013.01)

(58) Field of Classification Search
CPC ... H04L 1/1854; H04L 1/1812; H04L 1/1861; H04L 5/0055; H04L 1/1822;
(Continued)

(56) References Cited

U.S. PATENT DOCUMENTS

2018/0070341 A1* 3/2018 Islam ............... H04L 5/0064
2018/0262304 A1   9/2018 Wang et al.
(Continued)

FOREIGN PATENT DOCUMENTS

CN   105722222 A   6/2016
CN   108024310 A   5/2018
(Continued)

OTHER PUBLICATIONS

First Office Action of the Chinese application No. 202310411068.8, issued on Sep. 2, 2024. 10 pages with English translation.
(Continued)

*Primary Examiner* — Mang Hang Yeung
(74) *Attorney, Agent, or Firm* — PERKINS COIE LLP

(57) ABSTRACT

A wireless communication method, a terminal device, and a network device are provided. The method comprises following operations. A terminal device receives indication information. The indication information is an acknowledgement (ACK)/non-acknowledgement (NACK) indication of at least one Hybrid Automatic Repeat Request (HARQ) process, and the HARQ process is an HARQ process corresponding to a first resource and/or a second resource, and the first resource has a different configuration mode from the second resource. The terminal device processes or does not process data transmission on the second resource according to the indication information, and/or processes data transmission on the first resource according to the indication information.

19 Claims, 10 Drawing Sheets

(58) Field of Classification Search
CPC .............. H04L 1/1887; H04W 72/115; H04W 74/0808; H04W 72/1263
USPC ........................................................ 370/329
See application file for complete search history.

(56) References Cited

U.S. PATENT DOCUMENTS

| | | | |
|---|---|---|---|
| 2018/0262316 | A1 | 9/2018 | Wang et al. |
| 2019/0037606 | A1 | 1/2019 | Takeda et al. |
| 2020/0067655 | A1* | 2/2020 | Zheng .................. H04L 1/1822 |
| 2020/0076547 | A1 | 3/2020 | Wang et al. |
| 2021/0352644 | A1* | 11/2021 | Zhou ........................ H04L 1/08 |

FOREIGN PATENT DOCUMENTS

| | | |
|---|---|---|
| CN | 108702687 A | 10/2018 |
| CN | 110352580 A | 10/2019 |
| CN | 110536393 A | 12/2019 |
| CN | 110972287 A | 4/2020 |
| CN | 111247836 A | 6/2020 |
| EP | 3240223 A1 | 11/2017 |
| EP | 3664334 A1 | 6/2020 |
| WO | 2018024946 A1 | 2/2018 |
| WO | 2020067985 A1 | 4/2020 |

OTHER PUBLICATIONS

LG Electronics: "Remaining issues of configured grant for NR-U", 3GPP Draft; R1-2004016, 3rd Generation Partnership Project (3GPP), Mobile Competence Centre; 650, Route Deslucioles; F-06921 Sophia-Antipolis Cedex; France vol. RAN WG1, no. e-Meeting; May 25, 2020-Jun. 5, 2020, May 16, 2020 (May 16, 2020), XP052345396,Paragraph "3. DCI format 0_2 for indicating CG-DFI" Paragraph "2. CG-DFI monitoring when supplementary UL carrier is configured" , 6 pages.

OPPO: "Considerations on configured grant for NR-U", 3GPP Draft; R1-1812804, 3rd Generation Partnership Project (3GPP), Mobile Competence Centre; 650, Route Deslucioles F-06921 Sophia-Antipolis Cedex; France vol. RAN WG1, no. Spokane, USA; Nov. 12, 2018-Nov. 16, 2018, Nov. 11, 2018 (Nov. 11, 2018), XP051554764,Paragraph "3. HARQ enhancement", Paragarph 4. "DFI", 3 pages.

Samsung: "Configured grant enhancement for NR-U",3GPP Draft; R1-2003863, 3rd Generation Partnership Project (3GPP), Mobile Competence Centre; 650, Route Deslucioles; F-06921 Sophia-Antipolis Cedex; France vol. Ran WG1, no. e-Meeting; May 25, 2020-Jun. 5, 2020, May 16, 2020 (May 16, 2020), XP052345244, Paragraph "2. DFI for CBG-based PUSCH", 3 pages.

Supplementary European Search Report in the European application No. 20947897.3, mailed on Jul. 13, 2023, 13 pages.

Moderatorhuawei. "Feature lead summary#1 on email discussion 100b-e-NR-unlic-NRU-HARQ-01 (Type-3 HARQ-ACK codebook)", 3GPP TSG RAN WG1 Meeting #100bis R1-2002922, Apr. 30, 2020 (Apr. 30, 2020).

International Search Report in the international application No. PCT/CN2020/107458, mailed on May 7, 2021.

Written Opinion of the International Search Authority in the international application No. PCT/CN2020/107458, mailed on May 7, 2021.

3GPP TSG-RAN2 #110_e R2-2005853, Electronic meeting, Jun. 1 to 12, 2020; Title: Corrections of NR operating with shared spectrum channel access in 38.321; Source to WG: Ericsson, Nokia.

* cited by examiner

WIRELESS COMMUNICATION METHOD, TERMINAL DEVICE, AND NETWORK DEVICE

CROSS-REFERENCE TO RELATED APPLICATION

This application is a continuation application of International Patent Application No. PCT/CN2020/107458, filed on Aug. 6, 2020, the disclosure of which is hereby incorporated by reference in its entirety.

BACKGROUND

At present, in a New Radio Unlicensed (NRU or NR-U) spectrum scenario, a network device may indicate, by means of a Downlink Feedback Indicator (DFI), an acknowledgement (ACK)/non-acknowledgement (NACK) indication of a Hybrid Automatic Repeat Request (HARQ) process corresponding to a pre-Configured Grant (CG) resource (that is, NRU CG resources) on a carrier wave. The NACK means that data on the HARQ process or the NRU CG resources is not received, and the data is required to be automatically retransmitted. The NACK means that the data on the HARQ process or the NRU CG resource is received, and it is not required to retransmit the data automatically.

It is considered in the Release (R) 17 that an Ultra Reliable and Low Latency Communications (URLLC) service is supported under the NRU scenario. A configuration mode of the CG resources (that is, URLLC CG resources) corresponding to the URLLC service is different from a configuration mode of the NRU CG resources. Therefore, in this case, how to determine whether the data on the URLLC CG resources and/or the NRU CG resources is processed, for example, whether the data is automatically transmitted, is the technical problem to be urgently solved in this disclosure.

SUMMARY

The embodiments of this disclosure relate to the field of communications, and particularly to a wireless communication method, a terminal device and a network device. Therefore, the terminal device can determine, according to indication information, whether data transmission on a first resource is processed, and/or process data transmission on the first resource according to the indication information.

A first aspect provides a wireless communication method. The method includes operations as follows. A terminal device receives indication information. The indication information is an acknowledgement (ACK)/non-acknowledgement (NACK) indication of at least one Hybrid Automatic Repeat Request (HARQ) process, the HARQ process is an HARQ process corresponding to a first resource and/or a second resource, and the first resource and the second resource have different configuration modes. The terminal device processes or does not process data transmission on the second resource according to the indication information, and/or processes data transmission on the first resource according to the indication information.

A second aspect provides a terminal device, including a processor, a transceiver and a memory. The memory is configured to store a computer program. The processor is configured to call and run the computer program stored in the memory, to execute: controlling the transceiver to receive indication information, where the indication information is an acknowledgement (ACK)/non-acknowledgement (NACK) indication of at least one Hybrid Automatic Repeat Request (HARQ) process, the HARQ process is an HARQ process corresponding to at least one of a first resource or a second resource, and the first resource has a different configuration mode from the second resource; and processing or not processing data transmission on the second resource according to the indication information, or processing data transmission on the first resource according to the indication information.

A third aspect provides a network device, including a processor, a transceiver and a memory. The memory is configured to store a computer program. The processor is configured to call and run the computer program stored in the memory, to execute controlling the transceiver to send indication information to a terminal device, where the indication information is an acknowledgement (ACK)/non-acknowledgement (NACK) indication of at least one Hybrid Automatic Repeat Request (HARQ) process, the HARQ process is an HARQ process corresponding to at least one of a first resource or a second resource, and the first resource has a different configuration mode from the second resource.

By means of any technical solution in the first aspect to the third aspect, the terminal device can determine, according to indication information, whether to process data transmission on a first resource, and/or process data transmission on the first resource according to the indication information.

DETAILED DESCRIPTION

Figure 1:
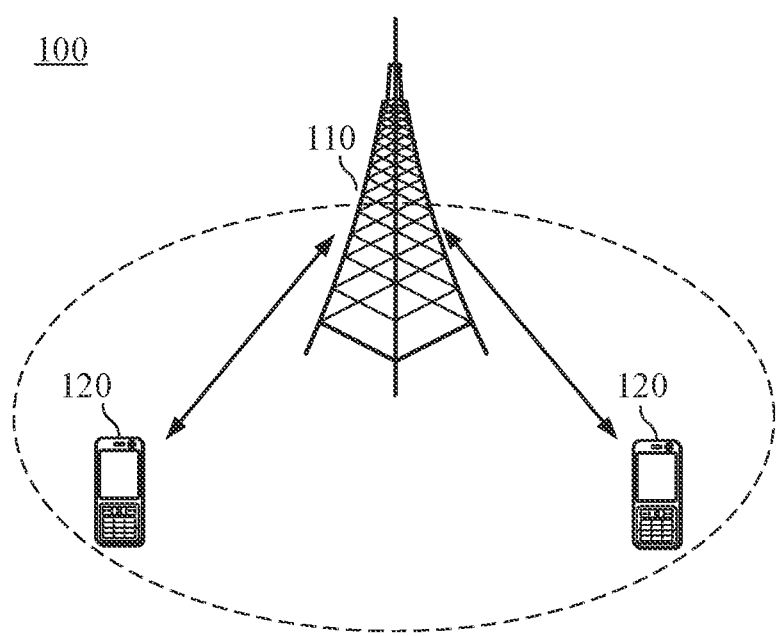
FIG. 1 is a schematic architecture diagram of a communication system according to an embodiment of this disclosure.

The technical solutions in the embodiments of this disclosure will be described below with reference to the drawings in the embodiments of this disclosure. It is apparent that the described embodiments are only part of the embodiments of this disclosure, not all the embodiments. All the embodiments obtained by those of ordinary skill in the art on the basis of the embodiments in this disclosure without creative work all fall within the scope of protection of this disclosure.

In order to better understand the embodiments of this disclosure, CG enhancement in URLLC, related background of NRU and the CG enhancement in the NRU are first described below.

CG Enhancement in URLLC:

In a first aspect, in order to support a high latency requirement for the URLLC service, a CG cycle for the URLLC service is enhanced, that is, the service cycle of any slot-level is supported.

In a second aspect, in order to support the high latency requirements in various URLLC service scenarios and of URLLC services, a plurality of CG configurations, that is, the CG resources, are introduced for the URLLC. The HARQ processes are different for different CG configurations. A parameter harq-ProcID-Offset2 can ensure that the HARQ processes are different for the different CG configurations.

In a third aspect, due to conflicting between the CG resources and other resources, in order to ensure that a Protocol Data Unit (PDU) of a Media Access Control Control Element (MAC CE) that has been packaged in the CG resources is not discarded or is transmitted as soon as possible, automatic transmission for the CG resources (that is, data on the CG resources) is introduced. Data on the CG resources, that cannot be transmitted due to resource conflict, of the packaged MAC PDU can be transmitted automatically by using another CG resources having the same CG configuration in the same HARQ process. It is determined based on the parameter autonomousTx that automatic transmission is to be used.

Related Background of NRU

The NRU includes the following several operation scenarios A to E.

The scenario A is a carrier-wave aggregation scenario. A Primary Cell (PCell) corresponds to a licensed spectrum, and a Secondary Cell (SCell) corresponds to the NRU.

The scenario B is a dual connection operation scenario. The PCell corresponds to an LTE licensed spectrum, and a Primary Secondary Cell (PScell) corresponds to the NRU.

The scenario C is an independent operation scenario, and an independent cell operates on the NRU.

The scenario D is an NR single cell scenario, an uplink (UL) operates on the licensed spectrum, and a downlink (DL) operates on the NRU.

The scenario E is the dual connection operation scenario, the PCell corresponds to the NR licensed spectrum, and the PScell corresponds to the NRU.

Generally, the operation band of the NRU is a 5 GHz unlicensed spectrum and a 6 GHz unlicensed spectrum. The design of the NRU on the unlicensed spectrum should guarantee fairness with other systems for example, Wireless Fidelity (WiFi) operated on these unlicensed spectrum. The principle of fairness is that, the impact of the NRU on the systems (for example, WiFi) deployed on the unlicensed spectrum cannot exceed the impact between these systems.

In order to guarantee the fairness coexistence between the systems on the unlicensed spectrum, energy detection is taken as a basic coexistence mechanism. A general energy detection mechanism is a Listen Before Talk (LBT) mechanism. The basic principle of the LBT mechanism is that, before transmitting data on the unlicensed spectrum, a network device or a terminal device should listen for a period of time according to the rules as a transmission end. If a listening result indicates that a channel is in an idle state, the transmission end may transmit data to a receiving end. If the listening result indicates that the channel is in an occupied state, the transmission end should waits for a period of time according to the rules and then continues to listen to the channel, and cannot transmit the data to the receiving end until the listening result for the channel indicates that the channel is idle.

CG Enhancement in NRU

In order to flexibly select resources, the HARQ process of the NRU CG is not calculated according to a formula, but is selected by the terminal device. For a CG resource, the network device configures an HARQ process set for the CG resource via Radio Resource Control (RRC) signaling. The terminal device may select one HARQ process from the set for the current CG transmission. The HARQ process set may be determined based on parameters harq-ProcID-Offset and nrofHARQ-Processes.

The NRU introduces with a plurality of CG configurations, and the plurality of CG configurations may share the HARQ process.

A cg-Retransmission Timer is introduced to support data transmission triggered when the CG resource cannot be transmitted since the LBT fails. After the cg-Retransmission Timer expires, and if a configured Grant Timer does not expire, data on the corresponding HARQ process or CG resource may be transmitted.

Data transmission on the CG resource may be interrupted by dynamically scheduling the DCI and DFI. Details are shown in Table 1.

TABLE 1

| | DFI = ACK | DFI = NACK | DCI = new tx (that is, DCI indicates new data transmission) | DCI = retx (that is, DCI indicates data retransmission) | The CG Timer expires |
|---|---|---|---|---|---|
| cg-Retransmission Timer | Stop | No impact, that is, continuing timing | Start or restart | Start or restart | None |
| configured Grant Timer | Stop | Stop | Stop | Stop | Stop |

As described above, R17 considers supporting an URLLC service under the NRU scenario. A configuration mode of the URLLC CG resources is different from a configuration mode of the NRU CG resources. Therefore, in this case, the technical problem to be urgently solved in this disclosure is how to determine whether to process data on the URLLC CG resources and/or the NRU CG resources, for example, whether to automatically transmit the data.

It is to be noted that, the technical solution of this disclosure is not only applicable to an NRU system, but also the embodiments of this disclosure are applicable to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, an New Radio (NR) system, an evolution system of the NR system, an LTE-based Access to Unlicensed Spectrum (LTE-U) system, a Universal Mobile Telecommunications System (UMTS), a Wireless Local Area Network (WLAN), WiFi, a next generation of communication systems, or other communication systems.

Generally, the number of connections supported in a conventional communication system is limited and is easy to implement. However, with the development of a communication technology, a mobile communication system not only supports traditional communications, but also supports, for example, Device to Device (D2D) communication, Machine to Machine (M2M) communication, Machine Type Communication (MTC), and Vehicle to Vehicle (V2V) communication. The embodiments of this disclosure may also be applied to these communication systems.

Optionally, the communication system in the embodiments of this disclosure may be applied to a Carrier Aggregation (CA) scenario, or may be applied to a Dual Connectivity (DC) scenario, or may be applied to a Standalone (SA) networking scenario.

The spectrum applied is not limited in the embodiments of this disclosure. For example, the embodiments of this disclosure may be applied to a licensed spectrum or an unlicensed spectrum. Correspondingly, resources mentioned in this disclosure below may be NRU resources, or may be licensed spectrum resources, and this disclosure is not limited thereto.

Exemplarily, a communication system 100 applied in an embodiment of this disclosure is shown in FIG. 1. The communication system 100 may include a network device 110. The network device 110 may be a device communicating with a terminal device 120 (or called a communication terminal or a terminal). The network device 110 may provide communication coverage for a specific geographical region, and may communicate with the terminal device located in the coverage region.

FIG. 1 exemplarily shows one network device and two terminal devices. Optionally, the communication system 100 may include a plurality of network devices, and other number of terminal devices may be provided in the coverage of each network device, which is not limited in the embodiments of this disclosure.

Optionally, the communication system 100 may further include other network entities such as a network controller and a mobile management entity, which is not limited in the embodiments of this disclosure.

It is to be understood that, a device having a communication function in a network/system in the embodiments of this disclosure may be called as a communication device. By taking the communication system 100 shown in FIG. 1 as an example, the communication device may include a network device 110 and a terminal device 120 having a communication function. The network device 110 and the terminal device 120 may be specific devices described above, which are not described herein again. The communication device may further include other devices, such as other network entities such as a network controller and a mobile management entity, in the communication system 100, which is not limited in the embodiments of this disclosure.

It is to be understood that, terms "system" and "network" in the disclosure may usually be exchanged in the disclosure. The term "and/or" in the disclosure is merely an association relationship describing related objects, which means that there may be three relationships, for example, A and/or B may indicate three cases: A exists alone, both A and B exist, and B exists alone. In addition, the character "/" in this disclosure generally indicates that the related objects are in an "or" relationship.

In the embodiments of this disclosure, the embodiments are described by combining the terminal device with the network device. The terminal device may also be called a User Equipment (UE), an access terminal, a user unit, a user station, a mobile station, a mobile platform, a remote station, a remote terminal, a mobile device, a user terminal, a terminal, a wireless communication device, a user agent, or a user device. The terminal device may be a STAION (ST) in the WLAN, or may be a cellular phone, a cordless phone, a Session Initiation Protocol (SIP) phone, a Wireless Local Loop (WLL) station, a Personal Digital Assistant (PDA) device, a handheld device having a wireless communication function, a computing device, another processing device connected to a wireless modem, an in-vehicle device, a wearable device or a next generation of communication systems, for example, a terminal device in an NR network, or a terminal device in a future evolved Public Land Mobile Network (PLMN).

As an example rather than a limitation, in the embodiments of this disclosure, the terminal device may also be the wearable device. The wearable device may also be called a wearable intelligent device, which is a generic term of daily wearable devices that are intelligently designed and developed by a wearable technology, for example, glasses, gloves, watches, clothing and shoes. The wearable device is a portable device that is directly worn on the body or integrated into the clothes or accessories of a user. The wearable device is not only a hardware device, but can also achieve powerful functions by means of software support, data interaction, and cloud interaction. In a broad sense, the wearable intelligent device includes for example a smart watch or smart glasses that have entire function and large size, and implement complete or partial functions without relying on smart phones, and for example various smart bands or smart jewelries for monitoring physical signs that have a specific application function and are used by cooperating with other devices such as the smart phones.

The network device may be a device configured to communicate with a mobile device. The network device may be an Access Point (AP) in the WLAN, a Base Transceiver Station (BTS) in the GSM or CDMA, or may be NodeB (NB) in the WCDMA, or may also be an Evolutional Node B (eNB or eNodeB) in the LTE, or a relay station or access point, or the in-vehicle device, the wearable device, and a network device or the gNBs in the NR network or a network device in a future evolved PLMN network, or the like.

In the embodiments of this disclosure, the network device provides a service for a cell. The terminal device communicates with the network device by a transmission resource (for example, a frequency domain resource, or to say, a spectrum resource) used by the cell. The cell may be a cell corresponding to the network device (such as the base station). The cell may belong to a macro base station, or may belong to the base station corresponding to a small cell. The small cell here may include a metro cell, a micro cell, a pico cell, a femto cell, and the like. These small cells have characteristics of small coverage and low transmitting power, and are suitable for providing high-speed data transmission services.

In addition, resources mentioned in this disclosure below may be CG resources, or may be Dynamic Configure (DG) resources, which is not limited in this disclosure.

First Embodiment

Figure 2:
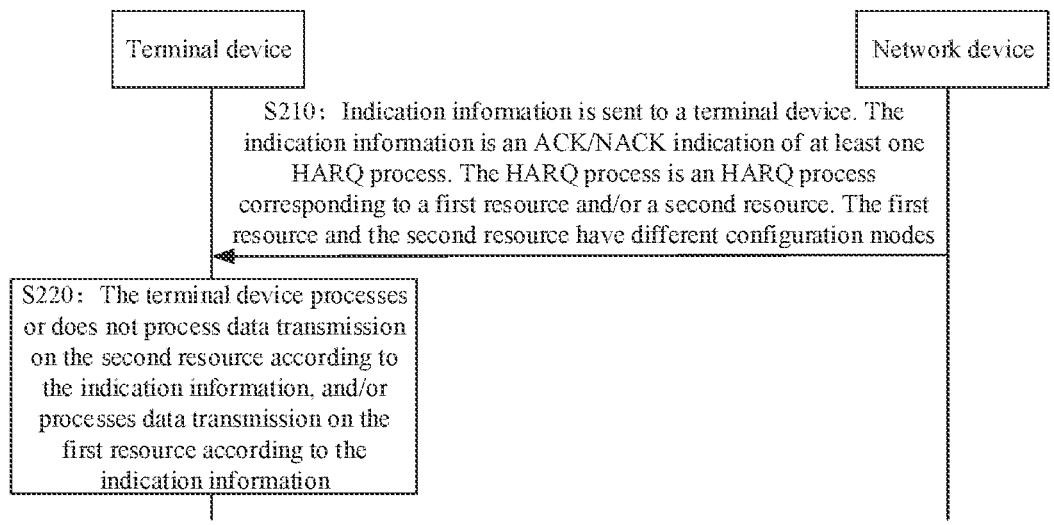
FIG. 2 is an interaction flowchart of a wireless communication method according to an embodiment of this disclosure.

FIG. 2 is an interaction flowchart of a wireless communication method according to an embodiment of this disclosure. The method includes the following operations S210 to S220.

At S210, a network device sends indication information to a terminal device. The indication information is an ACK/NACK indication of at least one HARQ process. The HARQ process is an HARQ process corresponding to a first resource and/or a second resource. The first resource and the second resource have different configuration modes.

At S220, the terminal device processes or does not process data transmission on the second resource according to the indication information, and/or the terminal device processes data transmission on the first resource according to the indication information.

Optionally, the indication information has any one of the following functions, but is not limited thereto.

The indication information is an ACK/NACK indication of the at least one HARQ process for one carrier wave.

The indication information is an ACK/NACK indication of the at least one HARQ process for a plurality of carrier waves.

The indication information is an ACK/NACK indication of the at least one HARQ process for one Bandwidth Part (BWP).

The indication information is an ACK/NACK indication of the at least one HARQ process for a plurality of BWPs.

It is to be noted that, the ACK/NACK indication of the at least one HARQ process includes respective ACK/NACK indication of the at least one HARQ process.

Optionally, the network device may only configure the first resource or the second resource for the terminal device.

Optionally, the network device may instruct to only activate or use the configured first resource or second resource.

Optionally, the network device may instruct to only activate or use a transmission mechanism (that is, a third transmission mechanism below) corresponding to the configured first resource or a transmission mechanism (that is, a first transmission mechanism or a second transmission mechanism below) corresponding to the second resource.

Optionally, the network device may simultaneously configure the first resource and the second resource for the terminal device.

Optionally, the network device may instruct to simultaneously activate or use the configured first resource and second resource.

Optionally, the network device may instruct to simultaneously activate or use the transmission mechanism (that is, the third transmission mechanism below) corresponding to the configured first resource and the transmission mechanism (that is, the first transmission mechanism or the second transmission mechanism below) corresponding to the second resource.

It is to be understood that, in this disclosure, the HARQ process corresponding to the first resource is also described as the HARQ process corresponding to only the first resource.

It is to be understood that, in this disclosure, the HARQ process corresponding to the second resource is also described as the HARQ process corresponding to only the second resource.

It is to be understood that, in this disclosure, the HARQ process corresponding to the first resource and the second resource is also described as the HARQ process that is shared by the first resource and the second resource.

Optionally, the first resource may be the NRU CG resource, and the second resource may be the URLLC CG resource, but this disclosure is not limited thereto, as long as the first resource and the second resource have different configuration modes.

The NRU CG resource is any CG resource under the NRU, or a CG resource of a configuration mode/parameter configuration of the NR in R16, or a CG resource of an NRU configuration mode/parameter configuration after R16. The URLLC CG resource is any CG resource corresponding to the URLLC service under the NR or NRU, or a CG resource of a configuration mode/parameter configuration of the NR in R16, or a CG resource of an NR/NRU configuration mode/parameter configuration of the NR/NRU after R16. The configuration mode of the NRU CG resource is different from the configuration mode of the URLLC CG resource.

It is to be noted that, the NRU CG resource may also carry the URLLC service. In this disclosure, in this case, the CG resource corresponding to the URLLC service is not referred to as the URLLC CG resource. That is to say, in this disclosure, the URLLC CG resource must meet a condition that the configuration mode of the URLLC CG resource is different from the configuration mode of the NRU CG resource.

An example in which the configuration mode of the NRU CG resource is different from the configuration mode of the URLLC CG resource is described below, but is not limited thereto.

Exemplarily, for the NRU CG resource, at least one of the following parameters is not configured: harq-ProcID-Offset2, Redundancy Version (RV) number repK_RV during retransmission, or autonomousTX, and at least one of the following parameters is configured: harq-ProcID-Offset, or cg-RetransmissionTimer. For the URLLC CG resource, at least one of the following parameters is not configured: harq-ProcID-Offset, or cg-RetransmissionTimer, and at least one of the following parameters is configured: harq-ProcID-Offset2, repK_RV, or autonomousTX.

The harq-ProcID-Offset2 and the autonomousTX are both the parameters in the CG enhancement in the URLLC. The harq-ProcID-Offset2 may guarantee configuring different HARQ processes for different CGs. The autonomousTX is used for determining to use automatic transmission. The repK_RV is used for determining the RV during retransmission. The harq-ProcID-Offset and the cg-RetransmissionTimer are both the parameters in the CG enhancement in the NRU. The harq-ProcID-Offset is used for determining an HARQ process set. The cg-RetransmissionTimer represents a CG Retransmission Timer. As described above, after the cg-Retransmission Timer expires, and if a CG Timer does not expire, data on the corresponding HARQ process or CG resource may be transmitted.

Exemplarily, assuming that there are 5 CG resources, in which, CG1, CG2 and CG3 having indexes of 1, 2 and 3 respectively are all NRU CG resources; and CG4 and CG5 having indexes of 4 and 5 respectively are both URLLC CG. Each of CG1, CG2 and CG3 is configured with parameters: configured Grant Timer, cg-RetransmissionTimer and HARQ process ID. The configured Grant Timer represents the CG timer, reference may be made to the above definition for the cg-RetransmissionTimer regarding the meaning of the cg-RetransmissionTimer, and the HARQ process ID represents an identifier of an HART process. Optionally, CG1 and CG2 may share the HARQ process ID, and CG3 does not share the HARQ process ID with CG1 or CG2. CG4 and CG5 are both configured with configured Grant Timer, HARQ process ID and autonomousTX. For the definition of the parameters, reference may be made the above content, which are not described thereto again. Optionally, the HARQ process IDs corresponding to CG4 and CG5 may be different from each other.

Optionally, the operation that the terminal device processes data transmission on the second resource according to the indication information includes the following situations, but is not limited thereto. The terminal device transmits data on the second resource according to the indication information. Alternatively, the terminal device does not transmit data on the second resource according to the indication information, that is, the terminal device determines to not transmit data on the second resource.

Optionally, the terminal device may not transmit the data on the second resource according to the indication information. Alternatively, the terminal device may ignore the indication information for the data on the second resource.

Optionally, the operation that the terminal device processes data transmission on the first resource according to the indication information includes the following situations, but is not limited thereto. The terminal device transmits data on the first resource according to the indication information. Alternatively, the terminal device does not transmit data on the first resource according to the indication information, that is, the terminal device determines to not transmit data on the first resource.

Optionally, the terminal device may not transmit data on the first resource according to the indication information. Alternatively, the terminal device may ignore the indication information for the data on the first resource.

In conclusion, in this disclosure, when the terminal device is configured with the first resource and the second resource simultaneously, the terminal device may determine, according to indication information, whether to process data transmission on a first resource, and/or process data transmission on the first resource according to the indication information.

Second Embodiment

The above operation S220 that the terminal device processes data transmission on the first resource according to the indication information is described in detail below.

Optionally, the operation that the terminal device processes data transmission on the first resource according to the indication information may be implemented by means of the following manners, but is not limited thereto.

The terminal device processes, according to the indication information, data transmission on the first resource according to the third transmission mechanism. The third transmission mechanism is a transmission mechanism of the first resource. In practical, the terminal device may process data transmission on the first resource according to other transmission mechanisms, for example, a first transmission mechanism or a second transmission mechanism. The first transmission mechanism is an automatic transmission mechanism of the second resource, and the second transmission mechanism is an enhanced automatic transmission mechanism of the second resource. Which transmission mechanism is used by the terminal device to process data transmission on the first resource is not limited in this disclosure.

Optionally, when the second resource is the URLLC CG resource, the first transmission mechanism may be an automatic transmission mechanism in R16. The automatic transmission mechanism in R16 is automatic transmission of data performed by using the same HARQ process as the second resource and the resources in the same configuration (that is, the CG configuration) as the second resource.

Optionally, the operation that the terminal device processes, according to the indication information, data transmission on the first resource according to the first transmission mechanism may be implemented by the following several optional manners, but is not limited thereto.

In a first optional manner, if the indication information includes a NACK indication of a second HARQ process corresponding to the first resource, the terminal device transmits the data on the first resource according to the first transmission mechanism. If the indication information includes an ACK indication of the second HARQ process, the terminal device does not transmit the data on the first resource.

In a second optional manner, if the indication information includes a NACK indication of a plurality of HARQ processes, the plurality of HARQ processes include the second HARQ process, and the first resource is a resource, on which data transmission is performed, determined according to a priority rule in resources corresponding to the plurality of HARQ processes, the terminal device transmits the data on the first resource according to the first transmission mechanism. If the indication information includes an ACK indication of the first resource, the terminal device does not transmit the data on the first resource.

In a third optional manner, if the indication information includes a NACK indication of the plurality of HARQ processes, the plurality of HARQ processes include the second HARQ process, and a PDU on the first resource is a PDU, on which data transmission is performed, determined according to a priority rule among PDUs on resources corresponding to the plurality of HARQ processes, the terminal device transmits the data on the first resource according to the first transmission mechanism. If the indication information includes an ACK indication of the second HARQ process, the terminal device does not transmit the data on the first resource.

In a fourth optional manner, if the indication information includes a NACK indication of a plurality of HARQ processes, and any one of the plurality of HARQ processes is selected as the second HARQ process, the terminal device transmits the data on the first resource according to the first transmission mechanism. If the indication information includes an ACK indication of the second HARQ process, the terminal device does not transmit the data on the first resource.

The first optional manner aims to introduce how the terminal device processes data transmission on the first resource in a case that the indication information only includes the NACK indication of the second HARQ process, or the indication information includes the ACK indication of the second HARQ process. The second optional manner to the fourth optical manner aim to introduce how the terminal device processes data transmission on the first resource in a case that the indication information includes the NACK indications of the plurality of HARQ processes, the plurality of HARQ processes including the second HARQ process, or the indication information includes the ACK indication of the second HARQ process.

It is to be noted that, "transmission" in the first to fourth optional manners may also be described as "automatic transmission" or "automatic retransmission".

The above four optional manners are respectively described below.

For the first optional manner, when the indication information includes the NACK indication of the second HARQ process corresponding to the first resource, it indicates that the data on the first resource failed to receive, and the terminal device needs to perform automatic transmission of the data on the first resource. The terminal device may perform automatic transmission of data according to the first transmission mechanism. When the indication information includes the ACK indication of the second HARQ process corresponding to the first resource, it indicates that the data on the first resource is successfully received, and the terminal device does not need to perform automatic transmission of the data on the first resource.

For the second optional manner, assuming that the first resource is the NRU CG resource, the plurality of HARQ processes have the following situations.

In the first situation, the plurality of HARQ processes include HARQ processes corresponding to a plurality of NRU CG resources.

In the second situation, the plurality of HARQ processes include an HARQ process corresponding to at least one NRU CG resource, and at least one other HARQ process.

The other HARQ process here may be any one of the HARQ process corresponding to the URLLC CG resource, and the HARQ process that is shared by the URLLC CG resource and the NRU CG resource.

Optionally, when the indication information includes the NACK indications of the plurality of HARQ processes, since the resource determined according to the first transmission mechanism is unique, and the resource can transmit only the data corresponding to the resource once, the terminal device may select, according to the priority rule, the resource on which automatic transmission of the data is performed. Herein, when the first resource is the resource, on which automatic transmission of the data is performed, selected by the terminal device according to the priority rule, the terminal device transmits the data on the first resource according to the first transmission mechanism. It is to be noted that, the number of determining the resource for automatic transmission of the above data is not limited. That is to say, for the HARQ process or resource, automatic transmission may be performed for a plurality of times.

Optionally, the priority rule includes, but is not limited to: a priority rule for a physical layer, a priority rule for a logic channel, or a priority rule for a resource type.

Optionally, when the indication information includes the ACK indication of the second HARQ process corresponding to the first resource, it indicates that the data on the first resource is successfully received, and the terminal device does not perform automatic transmission of data on the first resource.

For the third optional manner, regarding the plurality of HARQ processes, reference may be made to the content in the second optional manner, which is not described in this disclosure again.

Optionally, when the indication information includes the NACK indications of the plurality of HARQ processes, since the resource determined according to the first transmission mechanism is unique, and the resource can transmit only the data corresponding to the resource once, the terminal device may select, according to the priority rule for the PDUs, the resource corresponding to the PDU on which automatic transmission of data is performed. Herein, when the first resource is the resource corresponding to the PDU, on which automatic transmission of data is performed, selected by the terminal device according to the priority rule for the PDUs, the terminal device transmits the data on the first resource according to the first transmission mechanism. It is to be noted that, the number of determining the resource for automatic transmission of the above data is not limited. That is to say, for the HARQ process or resource, automatic transmission may be performed for a plurality of times.

Optionally, the priority rule for the PDUs includes but is not limited to: a priority rule of transmission according to the size of an identifier of the PDU, a priority rule of transmission according to the length of the PDU, a priority rule of transmission according to a data size carried by the PDU, and a priority rule determined according to the priority of the logic channel in the PDU.

Optionally, when the indication information includes the ACK indication of the second HARQ process corresponding to the first resource, it indicates that the data on the first resource is successfully received, and the terminal device does not perform automatic transmission of data on the first resource.

For the fourth optional manner, a difference between the fourth optional manner and the first optional manner lies in that, in the fourth optional manner, the indication information includes the NACK indications of the plurality of HARQ processes or includes the ACK indication of the second HARQ process, and the plurality of HARQ processes include the second HARQ process, but the second HARQ process is randomly selected by the terminal device. In the first optional manner, the indication information only includes the NACK indication of the second HARQ process, or includes the ACK indication of the second HARQ process. Therefore, regarding the fourth optional manner, reference may be made to the first optional manner, which is not described thereto again.

Optionally, when the second resource is the URLLC CG resource, the second transmission mechanism may be the enhanced automatic transmission mechanism in R17. The enhanced automatic transmission mechanism in R17 is automatic transmission of data performed by using a different HARQ process from the second resource and/or the resources in the different configuration (that is, the CG configuration) from the second resource.

Optionally, the operation that the terminal device processes, according to the indication information, data transmission on the first resource in accordance with the second transmission mechanism may be implemented by means of the following several optional manners, but is not limited thereto.

In a first optional manner, if the indication information includes the NACK indication of a second HARQ process corresponding to the first resource, the terminal device transmits the data on the first resource according to the second transmission mechanism. If the indication information includes the ACK indication of the second HARQ process, the terminal device does not transmit the data on the first resource.

In a second optional manner, if the indication information includes the NACK indication of a plurality of HARQ processes, the plurality of HARQ processes include the second HARQ process, and the first resource is a resource, on which data transmission is performed, determined according to a priority rule in resources corresponding to the plurality of HARQ processes, the terminal device transmits the data on the first resource according to the second transmission mechanism. If the indication information includes the ACK indication of the first resource, the terminal device does not transmit the data on the first resource.

In a third optional manner, if the indication information includes the NACK indication of the plurality of HARQ processes, the plurality of HARQ processes include the second HARQ process, and a PDU on the first resource is a PDU, on which data transmission is performed, determined according to a priority rule in the PDUs on resources corresponding to the plurality of HARQ processes, the terminal device transmits the data on the first resource according to the second transmission mechanism. If the indication information includes the ACK indication of the second HARQ process, the terminal device does not transmit the data on the first resource.

In a fourth optional manner, if the indication information includes the NACK indication of a plurality of HARQ processes, and any one of the plurality of HARQ processes is selected as the second HARQ process, the terminal device transmits the data on the first resource according to the second transmission mechanism. If the indication information includes the ACK indication of the second HARQ process, the terminal device does not transmit the data on the first resource.

The first optional manner aims to introduce how the terminal device processes data transmission on the first resource in a case that the indication information only includes the NACK indication of the second HARQ process, or the indication information includes the ACK indication of the second HARQ process. The second optional manner to the fourth optical manner aim to introduce how the terminal device processes data transmission on the first resource in a case that the indication information includes the NACK indications of the plurality of HARQ processes, the plurality of HARQ processes including the second HARQ process, or the indication information includes the ACK indication of the second HARQ process.

It is to be noted that, "transmission" in the first to fourth optional manners may also be described as "automatic transmission" or "automatic retransmission".

The above four optional manners are respectively described below.

For the first optional manner, when the indication information includes the NACK indication of the second HARQ process corresponding to the first resource, it indicates that the data on the first resource failed to receive, and the terminal device needs to perform automatic transmission of the data on the first resource. The terminal device may perform automatic transmission of data according to the second transmission mechanism. When the indication information includes the ACK indication of the second HARQ process corresponding to the first resource, it indicates that the data on the first resource is successfully received, and the terminal device does not need to perform automatic transmission of the data on the first resource.

For the second optional manner, assuming that the first resource is the NRU CG resource, the plurality of HARQ processes have the following situations.

In the first situation, the plurality of HARQ processes include process corresponding to at least one NRU CG resource, and at least one other HARQ process.

The other HARQ process here may be any one of the HARQ process corresponding to the URLLC CG resource, and the HARQ process that is shared by the URLLC CG resource and the NRU CG resource.

Optionally, when the indication information includes the NACK indications of the plurality of HARQ processes, since the resource determined according to the second transmission mechanism is unique, and the resource can transmit only the data corresponding to the resource once, the terminal device may select, according to the priority rule, the resource on which automatic transmission of the data is performed. Herein, when the first resource is the resource, on which automatic transmission of the data is performed, selected by the terminal device according to the priority rule, the terminal device transmits the data on the first resource according to the second transmission mechanism. It is to be noted that, the number of determining the resource for automatic transmission of the above data is not limited. That is to say, for the HARQ process or resource, automatic transmission may be performed for a plurality of times.

Optionally, the priority rule includes, but is not limited to: a priority rule for a physical layer, a priority rule for a logic channel, or a priority rule for a resource type.

Optionally, when the indication information includes the ACK indication of the second HARQ process corresponding to the first resource, it indicates that the data on the first resource is successfully received, and the terminal device does not perform automatic transmission of data on the first resource.

For the third optional manner, regarding the plurality of HARQ processes, reference may be made to the content in the second optional manner, which is not described in this disclosure again.

Optionally, when the indication information includes the NACK indications of the plurality of HARQ processes, since the resource determined according to the second transmission mechanism is unique, and the resource can transmit only the data corresponding to the resource once, the terminal device may select, according to the priority rule for the PDUs, the resource corresponding to the PDU, on which automatic transmission of data is performed. Herein, when the first resource is the resource corresponding to the PDU, on which automatic transmission of data is performed, selected by the terminal device according to the priority rule for the PDUs, the terminal device transmits the data on the first resource according to the second transmission mechanism. It is to be noted that, the number of determining the resource for automatic transmission of the above data is not limited. That is to say, for the HARQ process or resource, automatic transmission may be performed for a plurality of times.

Optionally, the priority rule for the PDUs includes but is not limited to: a priority rule of transmission according to the size of an identifier of the PDU, a priority rule of transmission according to the length of the PDU, a priority rule of transmission according to a data size carried by the PDU, and a priority rule determined according to the priority of the logic channel in the PDU.

Optionally, when the indication information includes the ACK indication of the second HARQ process corresponding to the first resource, it indicates that the data on the first resource is successfully received, and the terminal device does not perform automatic transmission of data on the first resource.

For the fourth optional manner, a difference between the fourth optional manner and the first optional manner lies in that, in the fourth optional manner, the indication information includes the NACK indications of the plurality of HARQ processes or includes the ACK indication of the second HARQ process, and the plurality of HARQ processes include the second HARQ process, but the second HARQ process is randomly selected by the terminal device. In the first optional manner, the indication information only includes the NACK indication of the second HARQ process, or includes the ACK indication of the second HARQ process. Therefore, regarding the fourth optional manner, reference may be made to the first optional manner, which is not described thereto again.

Optionally, the third transmission mechanism is automatic transmission of data on a resource (that is, a seventh resource in this disclosure) which is the first resource after the indication information is received. Based on this, the seventh resource is a resource, a time of data transmission on which after the indication information is received is closest to a time for receiving the indication information. Optionally, the seventh resource is an available/effective resource, or a resource when LBT succeeds.

It is to be understood that, the third transmission mechanism is also described as automatic transmission of data performed by using the first available/effective resource which is the first resource after the indication information is received. Alternatively, the third transmission mechanism is automatic transmission of data performed by using the closest resource after the indication information is received. Alternatively, the third transmission mechanism is is automatic transmission of data performed by using the closest available/effective resource after the indication information is received.

Optionally, the seventh resource shares the first HARQ process with the first resource and has the same or different configurations from the first resource. Alternatively, the seventh resource has a different configuration from the first resource.

Exemplarily, when the first resource is the NRU CG resource, the seventh resource is also the NRU CG resource.

Optionally, when the first resource is the NRU CG resource, the third transmission mechanism is automatic transmission of data performed by using the first NRU resource after the indication information is received. Alternatively, the third transmission mechanism is automatic transmission of data performed by using the first available/effective NRU resource which is the first resource after the indication information is received. Alternatively, the third transmission mechanism is automatic transmission of data performed by using the closest NRU resource after the indication information is received. Alternatively, the third transmission mechanism is automatic transmission of data performed by using the closest available/effective NRU resource after the indication information is received. Optionally, the resource is the available/effective resource, or a resource when LBT succeeds.

Optionally, the operation that the terminal device processes, according to the indication information, data transmission on the first resource in accordance with the third transmission mechanism may be implemented by the following several optional manners, but is not limited thereto.

In a first optional manner, if the indication information includes the NACK indication of a second HARQ process corresponding to the first resource, the terminal device transmits the data on the first resource according to the third transmission mechanism. If the indication information includes the ACK indication of the second HARQ process, the terminal device does not transmit the data on the first resource.

In a second optional manner, if the indication information includes the NACK indication of a plurality of HARQ processes, the plurality of HARQ processes include the second HARQ process, and the first resource is a resource, on which data transmission is performed, determined according to a priority rule in resources corresponding to the plurality of HARQ processes, the terminal device transmits the data on the first resource according to the third transmission mechanism. If the indication information includes the ACK indication of the first resource, the terminal device does not transmit the data on the first resource.

In a third optional manner, if the indication information includes the NACK indication of the plurality of HARQ processes, the plurality of HARQ processes include the second HARQ process, and a PDU on the first resource is a PDU, on which data transmission is performed, determined according to a priority rule in the PDUs on resources corresponding to the plurality of HARQ processes, the terminal device transmits the data on the first resource according to the third transmission mechanism. If the indication information includes the ACK indication of the second HARQ process, the terminal device does not transmit the data on the first resource.

In a fourth optional manner, if the indication information includes the NACK indication of a plurality of HARQ processes, and any one of the plurality of HARQ processes is selected as the second HARQ process, the terminal device transmits the data on the first resource according to the third transmission mechanism. If the indication information includes the ACK indication of the second HARQ process, the terminal device does not transmit the data on the first resource.

The first optional manner aims to introduce about how the terminal device processes data transmission on the first resource in a case that the indication information only includes the NACK indication of the second HARQ process, or the indication information includes the ACK indication of the second HARQ process. The second optional manner to the fourth optical manner aim to introduce how the terminal device processes data transmission on the first resource in a case that the indication information includes the NACK indications of the plurality of HARQ processes, the plurality of HARQ processes including the second HARQ process, or the indication information includes the ACK indication of the second HARQ process.

It is to be noted that, "transmission" in the first to fourth optional manners may also be described as "automatic transmission" or "automatic retransmission".

The above four optional manners are respectively described below.

For the first optional manner, when the indication information includes the NACK indication of the second HARQ process corresponding to the first resource, it indicates that the data on the first resource failed to receive, and the terminal device needs to perform automatic transmission of the data on the first resource. The terminal device may perform automatic transmission of data according to the third transmission mechanism. When the indication information includes the ACK indication of the second HARQ process corresponding to the first resource, it indicates that the data on the first resource is successfully received, and the terminal device does not need to perform automatic transmission of the data on the first resource.

For the second optional manner, assuming that the first resource is the NRU CG resource, the plurality of HARQ processes have the following situations.

In the first situation, the plurality of HARQ processes include the HARQ processes corresponding to a plurality of NRU CG resources.

In the second situation, the plurality of HARQ processes include the HARQ process corresponding to at least one NRU CG resource, and at least one other HARQ process.

The other HARQ process here may be any one of the HARQ process corresponding to the URLLC CG resource, and the HARQ process that is shared by the URLLC CG resource and the NRU CG resource.

Optionally, when the indication information includes the NACK indications of the plurality of HARQ processes, since the seventh resource determined according to the third transmission mechanism is unique, and the seventh resource can transmit only the data corresponding to the resource once, the terminal device may select, according to the priority rule, the resource on which automatic transmission of the data is performed. Herein, when the first resource is the resource, on which automatic transmission of the data is performed, selected by the terminal device according to the priority rule, the terminal device transmits the data on the first resource according to the third transmission mechanism. It is to be noted that, the number of determining the seventh resource is not limited. That is to say, for the HARQ process or resource, automatic transmission may be performed for a plurality of times.

Optionally, the priority rule includes, but is not limited to: a priority rule for a physical layer, a priority rule for a logic channel, or a priority rule for a resource type.

Optionally, when the indication information includes the ACK indication of the second HARQ process corresponding to the first resource, it indicates that the data on the first resource is successfully received, and the terminal device does not perform automatic transmission of data on the first resource.

For the third optional manner, regarding the plurality of HARQ processes, reference may be made to the content in the second optional manner, which is not described in this disclosure again.

Optionally, when the indication information includes the NACK indications of the plurality of HARQ processes, since the seventh resource determined according to the third transmission mechanism is unique, and the seventh resource can transmit only the data corresponding to the resource once, the terminal device may select, according to the priority rule for the PDUs, the resource corresponding to the PDU, on which automatic transmission of data is performed. Herein, when the first resource is the resource corresponding to the PDU, on which automatic transmission of data is performed, selected by the terminal device according to the priority rule for the PDUs, the terminal device transmits the data on the first resource according to the third transmission mechanism. It is to be noted that, the number of determining the seventh resource is not limited. That is to say, for the HARQ process or resource, automatic transmission may be performed for a plurality of times.

Optionally, the priority rule for the PDUs includes but is not limited to: a priority rule of transmission according to the size of an identifier of the PDU, a priority rule of transmission according to the length of the PDU, a priority rule of transmission according to a data size carried by the PDU, and a priority rule determined according to the priority of the logic channel in the PDU.

Optionally, when the indication information includes the ACK indication of the second HARQ process corresponding to the first resource, it indicates that the data on the first resource is successfully received, and the terminal device does not perform automatic transmission of data on the first resource.

For the fourth optional manner, a difference between the fourth optional manner and the first optional manner lies in that, in the fourth optional manner, the indication information includes the NACK indications of the plurality of HARQ processes or includes the ACK indication of the second HARQ process, and the plurality of HARQ processes include the second HARQ process, but the second HARQ process is randomly selected by the terminal device. In the first optional manner, the indication information only includes the NACK indication of the second HARQ process, or includes the ACK indication of the second HARQ process. Therefore, regarding the fourth optional manner, reference may be made to the first optional manner, which is not described thereto again.

It is to be noted that, the terminal device may stop the cg-Retransmission Timer when the terminal device transmits the data on the first resource according to the third transmission mechanism, and may restart the cg-Retransmission Timer when performing automatic transmission. When the terminal device does not transmit the data on the first resource, the terminal device may stop the cg-Retransmission Timer and the configured Grant Timer. When the terminal device receives the indication information, the terminal device may stop the cg-Retransmission Timer.

As an example, if the second process corresponds to the second resource and the first resource, the terminal device may also process or not process data transmission on the first resource according to one of the first transmission mechanism, the second transmission mechanism or the third transmission mechanism.

As another example, if the second process corresponds to the second resource and the first resource, the terminal device may also process or not process, according to the indication information, data transmission on the first resource in a data transmission mode on a third resource which is used prior to receiving the indication information.

Exemplarily, if the first resource is the NRU CG resource, the second resource is the URLLC CG resource, and the third resource is also the NRU CG resource, the second HARQ process shared by the first resource and the second resource is understood as the HARQ process of the first resource. That is to say, a data transmission mode of the first resource is the same as a data transmission mode of the third resource. In this case, the terminal device processes the data on the first resource. If the first resource is the NRU CG resource, the second resource is the URLLC CG resource, and the third resource is also the URLLC CG resource, the second HARQ process shared by the first resource and the second resource is understood as the HARQ process of the second resource. In this case, the terminal device does not process the data on the first resource.

Exemplarily, if NRU CG and URLLC CG configuration parameters or modes are simultaneously configured, and if the first resource is the NRU CG resource, the second resource is the URLLC CG resource, and the third resource is also the CG resource, the first resource and the second resource share the second HARQ process. In this case, if the HARQ process corresponding to the third resource is a shared HARQ process, and the previous one resource transmission of the shared HARQ process is of an NRU CG resource transmission mode, the third resource is transmitted by means of the NRU CG transmission mode. If the HARQ process corresponding to the third resource is the shared HARQ process, and the previous one resource transmission of the shared HARQ process is of an URLLC CG resource transmission mode, the third resource is transmitted by means of the URLLC CG transmission mode.

It is to be understood that, in this disclosure, the operation that if the indication information includes the ACK indication of the second HARQ process, the terminal device does not transmit the data on the first resource may also be described as that if the indication information includes the ACK indication of the second HARQ process, the terminal device does not transmit the data on the first resource according to the third transmission mechanism.

In conclusion, in this disclosure, the terminal device may process the data on the first resource according to the indication information.

Third Embodiment

The operation S220 that the terminal device processes or does not process data transmission on the second resource according to the indication information is described in detail below.

Optionally, if the first HARQ process corresponds to the second resource, the terminal device does not process data transmission on the second resource, or the terminal device ignores the indication information. If the first HARQ process corresponds to the second resource and the first resource, the terminal device processes or does not process, according to the indication information, data transmission on the second resource in a data transmission mode on the third resource which is used prior to receiving the indication information.

Optionally, the third resource is a resource, a time of data transmission on which before the indication information is received is closest to the time when the indication information is received.

It is to be understood that, the third resource may also be an available/effective resource, a time of data transmission on which before the indication information is received is closest to the time when the indication information is received. Alternatively, the third resource is a resource which is the first prior to receiving the indication information. Alternatively, the third resource is an available/effective resource which is the first prior to receiving the indication information. Alternatively, the third resource is a resource which is the closest before the indication information is received. Alternatively, the third resource is an available/effective resource which is the closest before the indication information is received. Optionally, the resource is the available/effective resource, or the resource when LBT succeeds.

Exemplarily, if the first resource is the NRU CG resource, the second resource is the URLLC CG resource, and the third resource is also the NRU CG resource, the first HARQ process shared by the first resource and the second resource is understood as the HARQ process of the first resource. In this case, the terminal device does not process the data on the second resource. If the first resource is the NRU CG resource, the second resource is the URLLC CG resource, and the third resource is also the URLLC CG resource, the first HARQ process shared by the first resource and the second resource is understood as the HARQ process of the second resource. In this case, when the first HARQ process corresponds to the second resource, the terminal device does not process data transmission on the second resource, or the terminal device ignores the indication information.

Exemplarily, if NRU CG and URLLC CG configuration parameters or modes are simultaneously configured, and if the first resource is the NRU CG resource, the second resource is the URLLC CG resource, and the third resource is also the CG resource, the first resource and the second resource share the second HARQ process. In this case, if the HARQ process corresponding to the third resource is a shared HARQ process, and a previous one resource transmission of the shared HARQ process is of an NRU CG resource transmission mode, the third resource is transmitted by means of the NRU CG transmission mode. If the HARQ process corresponding to the third resource is the shared HARQ process, and a previous one resource transmission of the shared HARQ process is of an URLLC CG resource transmission mode, the third resource is transmitted by means of the URLLC CG transmission mode.

In conclusion, in this disclosure, if the first HARQ process corresponds to the second resource, the terminal device does not process data transmission on the second resource, or the terminal device ignores the indication information. Based on this, the data processing complexity of the terminal device can be reduced. If the first HARQ process corresponds to the second resource and the first resource, the terminal device processes or does not process, according to the indication information, data transmission on the second resource in a data transmission mode on the third resource which is used prior to receiving the indication information, to determine whether the second resource is processed, and the transmission processing manner if it is determined to process the data transmission.

Fourth Embodiment

The operation S220 that the terminal device processes or does not process data transmission on the second resource according to the indication information is described in detail below.

Optionally, if the first HARQ process corresponds to the second resource, the terminal device processes, according to the indication information, data transmission on the second resource in accordance with the first transmission mechanism or the second transmission mechanism. If the first HARQ process corresponds to the second resource and the first resource, the terminal device processes or does not process, according to the indication information, data transmission on the second resource in a data transmission mode on the third resource which is used prior to receiving the indication information. Alternatively, if the first process corresponds to the second resource and the first resource, the terminal device may also process or not process data transmission on the second resource according to one of the first transmission mechanism, the second transmission mechanism or the third transmission mechanism.

Optionally, the operation that the terminal device processes, according to the indication information, data transmission on the second resource in accordance with the first transmission mechanism or the second transmission mechanism may be implemented by the following several optional manners, but which is not limited thereto.

In the first optional manner, if the indication information includes the NACK indication of the first HARQ process, the terminal device transmits the data on the second resource according to the first transmission mechanism or the second transmission mechanism. If the indication information includes the ACK indication of the first HARQ process, the terminal device does not transmit the data on the second resource.

In a second optional manner, if the indication information includes the NACK indication of the plurality of HARQ processes, the plurality of HARQ processes include the first HARQ process, and the second resource is a resource, on which data transmission is performed, determined according to the priority rule in the resources corresponding to the plurality of HARQ processes, the terminal device transmits the data on the second resource according to the first transmission mechanism or the second transmission mechanism. If the indication information includes the ACK indication of the first HARQ process, the terminal device does not transmit the data on the second resource.

In a third optional manner, if the indication information includes the NACK indication of the plurality of HARQ processes, the plurality of HARQ processes include the first HARQ process, and a PDU on the second resource is a PDU, on which data transmission is performed, determined according to the priority rule in the PDUs on resources corresponding to the plurality of HARQ processes, the terminal device transmits the data on the second resource according to the first transmission mechanism or the second transmission mechanism. If the indication information includes the ACK indication of the first HARQ process, the terminal device does not transmit the data on the second resource.

In a fourth optional manner, if the indication information includes the NACK indication of a plurality of HARQ processes, and any one of the plurality of HARQ processes is selected as the first HARQ process, the terminal device transmits the data on the second resource according to the first transmission mechanism or the second transmission mechanism. If the indication information includes the ACK indication of the first HARQ process, the terminal device does not transmit the data on the second resource.

It is to be noted that, the first optional manner aims to introduce how the terminal device processes data transmission on the second resource in a case that the indication information only includes the NACK indication of the first HARQ process, or the indication information includes the ACK indication of the first HARQ process. The second optional manner to the fourth optical manner aim to introduce how the terminal device processes data transmission on the second resource in a case that the indication information includes the NACK indications of the plurality of HARQ processes, the plurality of HARQ processes including the first HARQ process, or the indication information includes the ACK indication of the first HARQ process.

It is to be noted that, "transmission" in the first to fourth optional manners may also be described as "automatic transmission" or "automatic retransmission".

The above four optional manners are respectively described below.

For the first optional manner, when the indication information includes the NACK indication of the first HARQ process corresponding to the second resource, it indicates that the data on the second resource failed receive, and the terminal device needs to perform automatic transmission of the data on the second resource. The terminal device may perform automatic transmission of data according to the first transmission mechanism or the second transmission mechanism. When the indication information includes the ACK indication of the first HARQ process corresponding to the second resource, it indicates that the data on the second resource is successfully received, and the terminal device does not need to perform automatic transmission of the data on the second resource.

For the second optional manner, assuming that the second resource is the URLLC CG resource, the plurality of HARQ processes have the following situations.

In the first situation, the plurality of HARQ processes include the HARQ processes corresponding to a plurality of URLLC CG resources.

In the second situation, the plurality of HARQ processes include the HARQ process corresponding to at least one URLLC CG resource, and at least one other HARQ process.

The other HARQ process here may be any one of the following: the HARQ process corresponding to the NRU CG resource, and the HARQ process that is shared by the URLLC CG resource and the NRU CG resource.

Optionally, when the indication information includes the NACK indications of the plurality of HARQ processes, since the resource determined according to the first transmission mechanism or the second transmission mechanism is unique, and the resource can transmit only the data corresponding to the resource once, the terminal device may select, according to the priority rule, the resource on which automatic transmission of the data is performed. Herein, when the second resource is the resource, on which automatic transmission of the data is performed, selected by the terminal device according to the priority rule, the terminal device transmits the data on the second resource according to the first transmission mechanism or the second transmission mechanism. It is to be noted that, the number of determining the resource for automatic transmission of the above data is not limited. That is to say, for the HARQ process or resource, automatic transmission may be performed for a plurality of times.

Optionally, the priority rule includes, but is not limited to: a priority rule for a physical layer, a priority rule for a logic channel, or a priority rule for a resource type.

Optionally, when the indication information includes the ACK indication of the first HARQ process corresponding to the second resource, it indicates that the data on the second resource is successfully received, and the terminal device does not perform automatic transmission of data on the second resource.

For the third optional manner, regarding the plurality of HARQ processes, reference may be made to the content in the second optional manner, which is not described in this disclosure again.

Optionally, when the indication information includes the NACK indications of the plurality of HARQ processes, since the resource determined according to the first transmission mechanism or the second transmission mechanism is unique, and the resource can transmit only the data corresponding to the resource once, the terminal device may select, according to the priority rule for the PDUs, the resource corresponding to the PDU, on which automatic transmission of data is performed. Herein, when the second resource is the resource corresponding to the PDU, on which automatic transmission of data is performed, selected by the terminal device according to the priority rule for the PDUs, the terminal device transmits the data on the second resource according to the first transmission mechanism or the second transmission mechanism. It is to be noted that, the number of determining the resource for automatic transmission of the above data is not limited. That is to say, for the HARQ process or resource, automatic transmission may be performed for a plurality of times.

Optionally, the priority rule for the PDUs includes but is not limited to: a priority rule of transmission according to the size of an identifier of the PDU, a priority rule of transmission according to the length of the PDU, a priority rule of transmission according to a data size carried by the PDU, and a priority rule determined according to the priority of the logic channel in the PDU.

Optionally, when the indication information includes the ACK indication of the first HARQ process corresponding to the second resource, it indicates that the data on the second resource is successfully received, and the terminal device does not perform automatic transmission of data on the second resource.

For the fourth optional manner, a difference between the fourth optional manner and the first optional manner lies in that, in the fourth optional manner, the indication information includes the NACK indications of the plurality of HARQ processes or includes the ACK indication of the first HARQ process, and the plurality of HARQ processes include the first HARQ process, but the first HARQ process is randomly selected by the terminal device. In the first optional manner, the indication information only includes the NACK indication of the first HARQ process, or includes the ACK indication of the first HARQ process. Therefore, regarding the fourth optional manner, reference may be made to the first optional manner, which is not described thereto again.

Optionally, the operation that the terminal device transmits the data on the second resource according to the first transmission mechanism includes an operation that the terminal device transmits the data on the second resource using the first HARQ process and a fourth resource having the same configuration as the second resource.

That is to say, the fourth resource shares the first HARQ process with the second resource, and has the same configuration as the second resource.

In this disclosure, as long as indexes of any two resources are identical, the configurations of the two resources are identical.

Optionally, the configuration of a resource includes at least one of a time-frequency position of the resource, or information about whether frequency hopping occurs.

Optionally, since there are a plurality of resources that share the first HARQ process with the second resource and has the same configuration as the second resource may exist or the resources that share the first HARQ process with the second resource and have the same configuration as the second resource occur periodically, in this disclosure, the fourth resource is an available/effective resource, a time of data transmission on which after the indication information is received is closest to a time for receiving the indication information, in the resources which share the first HARQ process with the second resource and have the same configuration as the second resource. It is to be noted that, the number of determining the fourth resource is not limited. That is to say, for the HARQ process or resource, automatic transmission may be performed for a plurality of times.

It is to be understood that, the fourth resource may also be described as follows. The fourth resource is an available/effective resource, a time of data transmission on which after the indication information is received is closest to a time for receiving the indication information, in the resources which share the first HARQ process with the second resource and have the same configuration as the second resource. Alternatively, the fourth resource is a resource, which is the first after the indication information is received, in the resources which share the first HARQ process with the second resource and have the same configuration as the second resource. Alternatively, the fourth resource is an available/effective resource, which is the first after the indication information is received, in the resources which share the first HARQ process with the second resource and have the same configuration as the second resource. Alternatively, the fourth resource is a resource, which is the closest after the indication information is received, in the resources which share the first HARQ process with the second resource and have the same configuration as the second resource. Alternatively, the fourth resource is an available/effective resource, which is the closest after the indication information is received, in the resources which share the first HARQ process with the second resource and have the same configuration as the second resource. Optionally, the resource is the available/effective resource, or the resource when LBT succeeds.

Exemplarily, when the second resource is the URLLC CG resource, the fourth resource should also be the URLLC CG resource.

Optionally, the operation that the terminal device transmits the data on the second resource according to the second transmission mechanism includes an operation as follows. The terminal device transmits data on the second resource by using a HARQ process different from the first HARQ process, and/or a fifth resource having a different configuration from the second resource.

That is to say, the fifth resource and the second resource correspond to different HARQ processes; and/or the fifth resource and the second resource have different configurations.

Optionally, since there are a plurality of resources that correspond to a different first HARQ process from the second resource and/or have a different configuration from the second resource or the resources that correspond to a different first HARQ process from the second resource and/or have a different configuration from the second resource occur periodically, in this disclosure, the fifth resource is a resource, a time of data transmission on which after the indication information is received is closest to a time for receiving the indication information, in the resources that correspond to a different HARQ process from the second resource and/or have a different configuration from the second resource. It is to be noted that, the number of determining the fifth resource is not limited. That is to say, for the HARQ process or resource, automatic transmission may be performed for a plurality of times.

It is to be understood that, the fifth resource may also be described as follows. The fifth resource is an available/effective resource, a time of data transmission on which after the indication information is received is closest to a time for receiving the indication information, in the resources that correspond to the different HARQ process from the second resource and/or have a different configuration from the second resource. Alternatively, the fifth resource is a resource, which is the first after the indication information is received, in the resources that correspond to the different HARQ process from the second resource and/or have a different configuration from the second resource. Alternatively, the fifth resource is an available/effective resource, which is the first after the indication information is received, in the resources that correspond to the different HARQ process from the second resource and/or have a different configuration from the second resource. Alternatively, the fifth resource is a resource, which is the closest after the indication information is received, in the resources that correspond to the different HARQ process from the second resource and/or have a different configuration from the second resource. Alternatively, the fifth resource is an available/effective resource, which is the closest after the indication information is received, in the resources that correspond to the different HARQ process from the second resource and/or have a different configuration from the second resource. Optionally, the resource is the available/effective resource, or the resource when LBT succeeds.

Exemplarily, when the second resource is the URLLC CG resource, the fifth resource should also be the URLLC CG resource.

If the first HARQ process corresponds to the second resource and the first resource, the operation that the terminal device processes or does not process, according to the indication information, data transmission on the second resource in a data transmission mode on the third resource which is used prior to receiving the indication information is described below.

For the definition of the third resource, reference is made to the third embodiment, and this disclosure is not described thereto again.

Exemplarily, if the first resource is the NRU CG resource, the second resource is the URLLC CG resource, and the third resource is also the NRU CG resource, the first HARQ process shared by the first resource and the second resource is understood as the HARQ process of the first resource. In this case, the terminal device does not process the data on the second resource. If the first resource is the NRU CG resource, the second resource is the URLLC CG resource, and the third resource is also the URLLC CG resource, the first HARQ process shared by the first resource and the second resource is understood as the HARQ process of the second resource. In this case, when the first HARQ process corresponds to the second resource, the terminal device processes, according to the indication information, data transmission on the second resource in accordance with the first transmission mechanism or the second transmission mechanism.

Exemplarily, if NRU CG and URLLC CG configuration parameters or modes are simultaneously configured, and if the first resource is the NRU CG resource, the second resource is the URLLC CG resource, and the third resource is also the CG resource, the first resource and the second resource share the second HARQ process. In this case, if the HARQ process corresponding to the third resource is a shared HARQ process, and a previous one resource transmission of the shared HARQ process is of an NRU CG resource transmission mode, the third resource is transmitted by means of the NRU CG transmission mode. If the HARQ process corresponding to the third resource is the shared HARQ process, and the previous one resource transmission of the shared HARQ process is of an URLLC CG resource transmission mode, the third resource is transmitted by means of the URLLC CG transmission mode.

It is to be understood that, in this disclosure, that if the indication information includes the ACK indication of the first HARQ process, the terminal device does not transmit the data on the second resource may also be described as follows. If the indication information includes the ACK indication of the first HARQ process, the terminal device does not transmit the data on the second resource according to the first transmission mechanism or the second transmission mechanism.

In conclusion, in this disclosure, if the first HARQ process corresponds to the second resource, the terminal device processes, according to the indication information, data transmission on the second resource in accordance with the first transmission mechanism or the second transmission mechanism. If the first HARQ process corresponds to the second resource and the first resource, the terminal device processes or does not process, according to the indication information, data transmission on the second resource in a data transmission mode on the third resource which is used prior to receiving the indication information. Therefore, the indication information may not only be applied to the first resource, but also be applied to the second resource, thereby enlarging an application range of the indication information, and introducing a non-adaptive data transmission indication mode for the second resource to a certain extent.

Fifth Embodiment

The operation S220 that the terminal device processes or does not process data transmission on the second resource according to the indication information is described in detail below.

Optionally, if the first HARQ process corresponds to the second resource, the terminal device processes, according to the indication information, data transmission on the second resource in accordance with a third transmission mechanism. The third transmission mechanism is a transmission mechanism of the first resource. If the first HARQ process corresponds to the second resource and the first resource, the terminal device processes or does not process, according to the indication information, data transmission on the second resource in a data transmission manner on the third resource which is used prior to receiving the indication information. Alternatively, if the first process corresponds to the second resource and the first resource, the terminal device may also process or not process data transmission on the second resource according to one of the first transmission mechanism, the second transmission mechanism or the third transmission mechanism.

Optionally, if the first HARQ process corresponds to the second resource, the terminal device processes, according to the indication information, data transmission on the second resource in accordance with a third transmission mechanism. The third transmission mechanism is a transmission mechanism of the first resource. If the first HARQ process corresponds to the second resource and the first resource, the terminal device processes or does not process, according to the indication information, data transmission on the second resource in a data transmission manner on the third resource which is used prior to receiving the indication information.

Optionally, the operation that the terminal device processes, according to the indication information, data transmission on the second resource in accordance with the third transmission mechanism may be implemented by means of the following several optional manners, but is not limited thereto.

In a first optional manner, if the indication information includes the NACK indication of the first HARQ process, the terminal device transmits the data on the second resource according to the third transmission mechanism. If the indication information includes the ACK indication of the first HARQ process, the terminal device does not transmit the data on the second resource.

In a second optional manner, if the indication information includes the NACK indication of a plurality of HARQ processes, the plurality of HARQ processes include the first HARQ process, and the second resource is a resource, on which data transmission is performed, determined according to a priority rule in resources corresponding to the plurality of HARQ processes, the terminal device transmits the data on the second resource according to the third transmission mechanism. If the indication information includes the ACK indication of the first HARQ process, the terminal device does not transmit the data on the second resource.

In a third optional manner, if the indication information includes the NACK indication of the plurality of HARQ processes, the plurality of HARQ processes include the first HARQ process, and a PDU on the second resource is a PDU, on which data transmission is performed, determined according to a priority rule in the PDUs on resources corresponding to the plurality of HARQ processes, the terminal device transmits the data on the second resource according to the third transmission mechanism. If the indication information includes the ACK indication of the first HARQ process, the terminal device does not transmit the data on the second resource.

In a fourth optional manner, if the indication information includes the NACK indication of a plurality of HARQ processes, and any one of the plurality of HARQ processes is selected as the first HARQ process, the terminal device transmits the data on the second resource according to the third transmission mechanism. If the indication information includes the ACK indication of the first HARQ process, the terminal device does not transmit the data on the second resource.

It is to be noted that, the first optional manner aims to introduce how the terminal device processes data transmission on the second resource in a case that the indication information only includes the NACK indication of the first HARQ process, or the indication information includes the ACK indication of the first HARQ process. The second optional manner to the fourth optical manner aim to introduce how the terminal device processes data transmission on the first resource in a case that the indication information includes the NACK indications of the plurality of HARQ processes, the plurality of HARQ processes including the first HARQ process, or the indication information includes the ACK indication of the first HARQ process.

It is to be noted that, "transmission" in the first to fourth optional manners may also be described as "automatic transmission" or "automatic retransmission".

The above four optional manners are respectively described below.

For the first optional manner, when the indication information includes the NACK indication of the first HARQ process corresponding to the second resource, it indicates that the data on the second resource failed to receive, and the terminal device needs to perform automatic transmission of the data on the second resource. The terminal device may perform automatic transmission of data according to the third transmission mechanism. When the indication information includes the ACK indication of the first HARQ process corresponding to the second resource, it indicates that the data on the second resource is successfully received, and the terminal device does not need to perform automatic transmission of the data on the second resource.

For the second optional manner, assuming that the second resource is the URLLC CG resource, the plurality of HARQ processes have the following situations.

In the first situation, the plurality of HARQ processes include the HARQ processes corresponding to a plurality of URLLC CG resources.

In the second situation, the plurality of HARQ processes include the HARQ process corresponding to at least one URLLC CG resource, and at least one other HARQ process.

The other HARQ process here may be any one of the HARQ process corresponding to the NRU CG resource, and the HARQ process that is shared by the URLLC CG resource and the NRU CG resource.

Optionally, when the indication information includes the NACK indications of the plurality of HARQ processes, since the resource determined according to the third transmission mechanism is unique, and the resource can transmit only the data corresponding to the resource once, the terminal device may select, according to the priority rule, the resource on which automatic transmission of the data is performed. Herein, when the second resource is the resource, on which automatic transmission of the data is performed, selected by the terminal device according to the priority rule, the terminal device transmits the data on the second resource according to the first transmission mechanism. It is to be noted that, the number of determining the resource for automatic transmission of the above data is not limited. That is to say, for the HARQ process or resource, automatic transmission may be performed for a plurality of times.

Optionally, the priority rule includes, but is not limited to: a priority rule for a physical layer, a priority rule for a logic channel, or a priority rule for a resource type.

Optionally, when the indication information includes the ACK indication of the first HARQ process corresponding to the second resource, it indicates that the data on the second resource is successfully received, and the terminal device does not perform automatic transmission of data on the second resource.

For the third optional manner, regarding the plurality of HARQ processes, reference may be made to the content in the second optional manner, which is not described in this disclosure again.

Optionally, when the indication information includes the NACK indications of the plurality of HARQ processes, since the resource determined according to the third transmission mechanism is unique, and the resource can only transmit the data corresponding to one resource once, the terminal device may select, according to the priority rule for the PDUs, the resource corresponding to the PDU on which automatic transmission of data is performed. Herein, when the second resource is the resource corresponding to the PDU, on which automatic transmission of data is performed, selected by the terminal device according to the priority rule for the PDUs, the terminal device transmits the data on the second resource according to the third transmission mechanism. It is to be noted that, the number of determining the resource for automatic transmission of the above data is not limited. That is to say, for the HARQ process or resource, automatic transmission may be performed for a plurality of times.

Optionally, the priority rule for the PDUs includes but is not limited to: a priority rule of transmission according to the size of an identifier of the PDU, a priority rule of transmission according to the length of the PDU, a priority rule of transmission according to a data size carried by the PDU, and a priority rule determined according to the priority of the logic channel in the PDU.

Optionally, when the indication information includes the ACK indication of the first HARQ process corresponding to the second resource, it indicates that the data on the second resource is successfully received, and the terminal device does not perform automatic transmission of data on the second resource.

For the fourth optional manner, a difference between the fourth optional manner and the first optional manner lies in that, in the fourth optional manner, the indication information includes the NACK indications of the plurality of HARQ processes or includes the ACK indication of the first HARQ process, and the plurality of HARQ processes include the first HARQ process, but the first HARQ process is randomly selected by the terminal device. In the first optional manner, the indication information only includes the NACK indication of the first HARQ process, or includes the ACK indication of the first HARQ process. Therefore, regarding the fourth optional manner, reference may be made to the first optional manner, which is not described thereto again.

Optionally, the operation that the terminal device transmits the data on the second resource according to the third transmission mechanism includes an operation that the terminal device transmits the data on the second resource on a sixth resource followed after the indication information is received.

Optionally, the sixth resource is a resource, a time of data transmission on which after the indication information is received is closest to the time for receiving the indication information.

It is to be understood that, the sixth resource may also be described as follows. The sixth resource is an available/effective resource, a time of data transmission on which is closest to the time when the indication information is received, after the indication information is received. Alternatively, the sixth resource is a resource which is the first after receiving the indication information. Alternatively, the sixth resource is an available/effective resource which is the first after receiving the indication information. Alternatively, the sixth resource is a resource which is the closest after the indication information is received. Alternatively, the sixth resource is an available/effective resource which is the closest after the indication information is received. Optionally, the resource is the available/effective resource, or the resource when LBT succeeds.

Optionally, the sixth resource shares the first HARQ process with the second resource and has a different configuration from the second resource. That is to say, the sixth resource shares the first HARQ process with the second resource, and has a different configuration from the second resource.

Exemplarily, when the second resource is the URLLC CG resource, the sixth resource here should be the NRU CG resource.

The operation that if the first HARQ process corresponds to the second resource and the first resource, the terminal device processes or does not process, according to the indication information, data transmission on the second resource in a data transmission mode on the third resource which is used prior to receiving the indication information is described below.

For the definition of the third resource, reference may be made to the third Embodiment, and this disclosure is not described thereto again.

Exemplarily, if the first resource is the NRU CG resource, the second resource is the URLLC CG resource, and the third resource is also the NRU CG resource, the first HARQ process shared by the first resource and the second resource is understood as the HARQ process of the first resource. In this case, the terminal device does not process the data on the second resource. If the first resource is the NRU CG resource, the second resource is the URLLC CG resource, and the third resource is also the URLLC CG resource, the first HARQ process shared by the first resource and the second resource is understood as the HARQ process of the second resource. In this case, when the first HARQ process corresponds to the second resource, the terminal device processes, according to the indication information, data transmission on the second resource in accordance with the third transmission mechanism.

Exemplarily, if NRU CG and URLLC CG configuration parameters or modes are simultaneously configured, and if the first resource is the NRU CG resource, the second resource is the URLLC CG resource, and the third resource is also the CG resource, the first resource and the second resource share the second HARQ process. In this case, if the HARQ process corresponding to the third resource is a shared HARQ process, and a previous one resource transmission of the shared HARQ process is in an NRU CG resource transmission mode, the third resource is transmitted by means of the NRU CG transmission mode. If the HARQ process corresponding to the third resource is the shared HARQ process, and previous one resource transmission of the shared HARQ process is in an URLLC CG resource transmission mode, the third resource is transmitted by means of the URLLC CG transmission mode.

Optionally, when the terminal device transmits the data on the second resource according to the third transmission mechanism, the terminal device at least sends an identifier of the first HARQ process to a network device. In addition, the terminal device may further send other information, such as RV, to the network device. In this disclosure, other information is not limited.

It is to be understood that, in this disclosure, the operation that if the indication information includes the ACK indication of the first HARQ process, the terminal device does not transmit the data on the second resource may also be described as follows. If the indication information includes the ACK indication of the first HARQ process, the terminal device does not transmit the data on the second resource according to the third transmission mechanism.

It is to be noted that, assuming that the first resource is the NRU CG, and the second resource is the URLLC CG, the terminal device may process, according to the indication information, data transmission on the second resource in accordance with the third transmission mechanism and/or on the URLLC CG resource. If the first HARQ process corresponds to the second resource and the first resource, the terminal device processes or does not process, according to the indication information, data transmission on the second resource in a data transmission mode on the third resource which is used before the indication information is received.

In conclusion, in this disclosure, if the first HARQ process corresponds to the second resource, the terminal device processes, according to the indication information, data transmission on the second resource in accordance with the third transmission mechanism. If the first HARQ process corresponds to the second resource and the first resource, the terminal device processes or does not process, according to the indication information, data transmission on the second resource in a data transmission mode on the third resource which is used before the indication information is received. Therefore, the indication information may not only be applied to the first resource, but also be applied to the second resource, thereby enlarging an application range of the indication information, and introducing a non-adaptive data transmission indication mode for the second resource to a certain extent.

Sixth Embodiment

Figure 3:
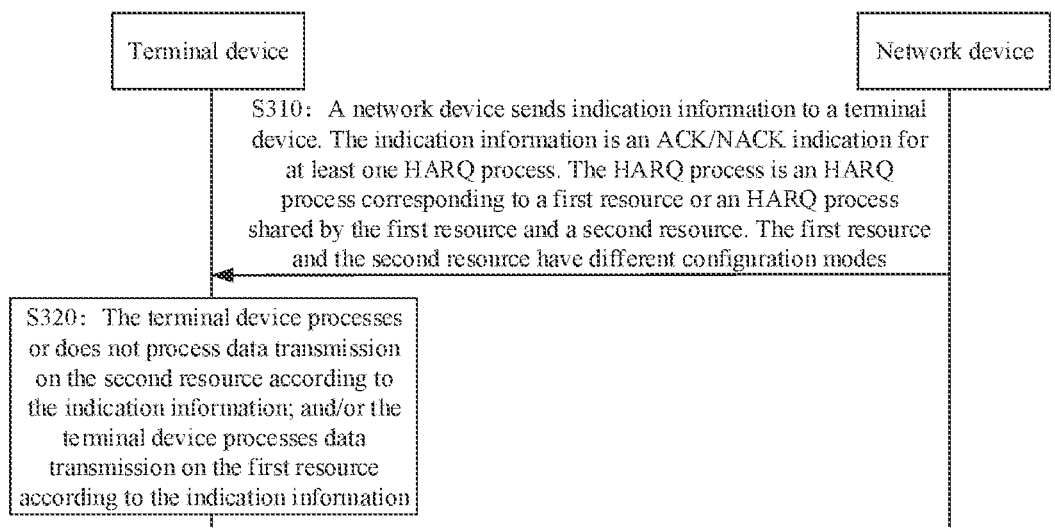
FIG. 3 is an interaction flowchart of a wireless communication method according to another embodiment of this disclosure.

FIG. 3 is an interaction flowchart of a wireless communication method according to another embodiment of this disclosure. The method includes the following operations S310 and S320.

At S310, a network device sends indication information to a terminal device. The indication information is an ACK/NACK indication for at least one HARQ process. The HARQ process is an HARQ process corresponding to a first resource or an HARQ process shared by the first resource and a second resource. The first resource and the second resource have different configuration modes.

At S320, the terminal device processes or does not process data transmission on the second resource according to the indication information, and/or the terminal device processes data transmission on the first resource according to the indication information.

It is to be understood that, a difference between the sixth embodiment and the first embodiment lies in that, the indication information in sixth embodiment is the ACK/NACK indication for at least one HARQ process. The HARQ process is the HARQ process corresponding to a first resource or the HARQ process shared by the first resource and the second resource. The first resource and the second resource have different configuration modes. The indication information in the first embodiment is the ACK/NACK indication of at least one HARQ process. The HARQ process is the HARQ process corresponding to the first resource and/or the second resource. The first resource and the second resource have different configuration modes. The remaining content is the same. Therefore, for the content of the sixth embodiment, reference may be made to the content of the first embodiment, which is not described in this disclosure again.

Regarding the operation S320 that the terminal device processes data transmission on the first resource according to the indication information, reference is made to the second embodiment. Regarding the operation S320 that the terminal device processes or does not process data transmission on the second resource according to the indication information, reference is made to the third embodiment. In this disclosure, details are not described thereto again.

Seventh Embodiment

The method embodiments of this disclosure are described above in detail in combination with FIG. 2 to FIG. 3. The apparatus embodiments of this disclosure are described in detail in combination with FIG. 4 to FIG. 10. It should be understood that, the apparatus embodiments mutually correspond to the method embodiments, and for similar descriptions, reference is made to the method embodiments.

Figure 4:
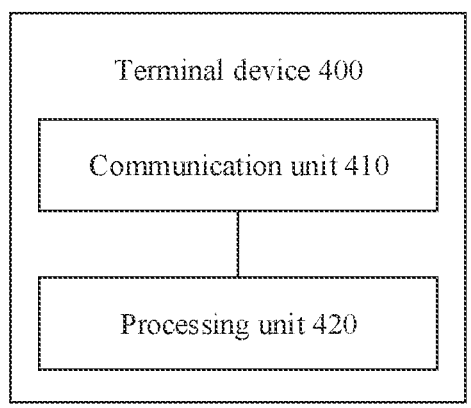
FIG. 4 is a schematic block diagram of a terminal device 400 according to an embodiment of this disclosure.

FIG. 4 is a schematic block diagram of a terminal device 400 according to an embodiment of this disclosure. As shown in FIG. 4, the terminal device 400 includes a communication unit and a processing unit.

The communication unit 410 is configured to receive indication information. The indication information is an ACK/NACK indication of at least one HARQ process. The HARQ process is an HARQ process corresponding to a first resource and/or a second resource. The first resource and the second resource have different configuration modes.

The processing unit 420 is configured to process or not process data transmission on the second resource according to the indication information, and/or process data transmission on the first resource according to the indication information.

Optionally, both the first resource and the second resource are resources in an unlicensed spectrum.

Optionally, both the first resource and the second resource are CG resources.

Optionally, the processing unit 420 is at least configured to: not process data transmission on the second resource or ignore the indication information, in response to that a first HARQ process corresponds to the second resource, and process or not process, according to the indication information, data transmission on the second resource in a data transmission mode on the third resource which is used prior to receiving the indication information in response to that the first HARQ process corresponds to the second resource and the first resource.

Optionally, the processing unit 420 is at least configured to process, according to the indication information, data transmission on the second resource in accordance with a first transmission mechanism or a second transmission mechanism in response to the first HARQ process corresponds to the second resource. The first transmission mechanism is an automatic transmission mechanism of the second resource, and the second transmission mechanism is an enhanced automatic transmission mechanism of the second resource. The processing unit 420 is at least configured to, in response to the first HARQ process corresponds to the second resource and the first resource, process or not process, according to the indication information, data transmission on the second resource in a data transmission mode on the third resource which is used prior to receiving the indication information.

Optionally, the processing unit 420 is at least configured to: transmit data on the second resource according to the first transmission mechanism or the second transmission mechanism in response to that the indication information includes the NACK indication of the first HARQ process; and not transmit the data on the second resource in response to that the indication information includes the ACK indication of the first HARQ process.

Optionally, the processing unit 420 is at least configured to: in response to that the indication information includes the NACK indication of the plurality of HARQ processes, the plurality of HARQ processes include the first HARQ process, and the second resource is a resource, on which data transmission is performed, determined according to a priority rule in the resources corresponding to the plurality of HARQ processes, transmit the data on the second resource according to the first transmission mechanism or the second transmission mechanism; and in response to that the indication information includes the ACK indication of the first HARQ process, not transmit the data on the second resource.

Optionally, the processing unit 420 is at least configured to: transmit the data on the second resource according to the first transmission mechanism or the second transmission mechanism in response to that the indication information includes the NACK indication of the plurality of HARQ processes, the plurality of HARQ processes include the first HARQ process, and a PDU on the second resource is a PDU, on which data transmission is performed, determined according to the priority rule among PDUs on resources corresponding to the plurality of HARQ processes; and not transmit the data on the second resource in response to that the indication information includes the ACK indication of the first HARQ process.

Optionally, the processing unit 420 is at least configured to: in response to that the indication information includes the NACK indication of a plurality of HARQ processes, and any one of the plurality of HARQ processes is selected as the first HARQ process, transmit data on the second resource according to the first transmission mechanism or the second transmission mechanism; and in response to that the indication information includes the ACK indication of the first HARQ process, not transmit the data on the second resource.

Optionally, the processing unit 420 is configured to transmit the data on the second resource by using the first HARQ process and a fourth resource having the same configuration as the second resource.

Optionally, the fourth resource is a resource, a time of data transmission on which after the indication information is received is closest to the time for receiving the indication information, in the resources which share the first HARQ process with the second resource and have the same configuration as the second resource.

Optionally, the processing unit 420 is configured to transmit the data on the second resource by using a different HARQ process from the first HARQ process and/or a fifth resource having a different configuration from the second resource.

Optionally, the fifth resource is a resource, a time of data transmission on which after the indication information is received is closest to a time for receiving the indication information, in the resources that correspond to a different HARQ process from the second resource and/or have a different configuration from the second resource.

Optionally, the processing unit 420 is at least configured to: in response to the first HARQ process corresponds to the second resource, process, according to the indication information, data transmission on the second resource in accordance with a third transmission mechanism, where the third transmission mechanism is the transmission mechanism of the first resource. The processing unit 420 is configured to in response to that the first HARQ process corresponds to the second resource and the first resource, process or not process, according to the indication information, data transmission on the second resource in a data transmission mode on the third resource which is used prior to receiving the indication information.

Optionally, the processing unit 420 is at least configured to: in response to that the indication information includes the NACK indication of the first HARQ process, transmit the data on the second resource according to the third transmission mechanism; and in response to that the indication information includes the ACK indication of the first HARQ process, not transmit the data on the second resource.

Optionally, the processing unit 420 is at least configured to: transmit the data on the second resource according to the third transmission mechanism in response to that the indication information includes the NACK indication of the plurality of HARQ processes, the plurality of HARQ processes include the first HARQ process, and the second resource is a resource, on which data transmission is performed, determined according to a priority rule in the resources corresponding to the plurality of HARQ processes; and not transmit the data on the second resource in response to that the indication information includes the ACK indication of the first HARQ process.

Optionally, the processing unit 420 is at least configured to: transmit the data on the second resource according to the third transmission mechanism in response to that the indication information includes the NACK indication of the plurality of HARQ processes, the plurality of HARQ processes include the first HARQ process, and a PDU on the second resource is a PDU, on which data transmission is performed, determined according to a priority rule among PDUs on resources corresponding to the plurality of HARQ processes; and not transmit the data on the second resource in response to that the indication information includes the ACK indication of the first HARQ process.

Optionally, the processing unit 420 is at least configured to: transmit the data on the second resource according to the third transmission mechanism in response to that the indication information includes the NACK indication of a plurality of HARQ processes, and any one of the plurality of HARQ processes is selected as the first HARQ process; and not transmit the data on the second resource in response to that the indication information includes the ACK indication of the first HARQ process.

Optionally, the processing unit 420 is configured to transmit the data on the second resource on a sixth resource followed after the indication information is received.

Optionally, the sixth resource is a resource, a time of data transmission on which after the indication information is received is closest to the time for receiving the indication information.

Optionally, the sixth resource shares the first HARQ process with the second resource and has a different configuration from the second resource.

Optionally, the communication unit 410 is further configured to: at least send an identifier of the first HARQ process to a network device.

Optionally, the third resource is a resource, a time of data transmission on which before the indication information is received is closest to the time for receiving the indication information.

Optionally, the processing unit 420 is configured to: process, according to the indication information, data transmission on the first resource in accordance with the third transmission mechanism. The third transmission mechanism is the transmission mechanism of the first resource.

Optionally, the processing unit 420 is at least configured to: transmit the data on the first resource according to the third transmission mechanism in response to that the indication information comprises the NACK indication of a second HARQ process corresponding to the first resource; and not transmit the data on the first resource in response to that the indication information includes the ACK indication of the second HARQ process.

Optionally, the processing unit 420 is at least configured to: transmit the data on the first resource according to the third transmission mechanism in response to that the indication information includes the NACK indication of a plurality of HARQ processes, the plurality of HARQ processes include the second HARQ process, and the first resource is a resource, on which data transmission is performed, determined according to a priority rule in resources corresponding to the plurality of HARQ processes; and not transmit the data on the first resource in response to that the indication information comprises the ACK indication of the first resource.

Optionally, the processing unit 420 is at least configured to: transmit the data on the first resource according to the third transmission mechanism in response to that the indication information includes the NACK indication of the plurality of HARQ processes, the plurality of HARQ processes include the second HARQ process, and a PDU on the first resource is a PDU, on which data transmission is performed, determined according to a priority rule among PDUs on resources corresponding to the plurality of HARQ processes; and not transmit the data on the first resource in response to that the indication information includes the ACK indication of the second HARQ process.

Optionally, the processing unit 420 is at least configured to: transmit the data on the first resource according to the third transmission mechanism in response to that the indication information includes the NACK indication of a plurality of HARQ processes, and any one of the plurality of HARQ processes is selected as the second HARQ process; and not transmit the data on the first resource in response to that the indication information includes the ACK indication of the second HARQ process.

Optionally, the processing unit 420 is configured to: transmit the data on the first resource on a seventh resource followed after the indication information is received.

Optionally, the seventh resource is a resource, a time of data transmission on which after the indication information is received is closest to the time for receiving the indication information.

Optionally, the seventh resource shares the first HARQ process with the first resource and has the same or different configuration from the first resource. Alternatively, the seventh resource has a different configuration from the first resource.

Optionally, in some embodiments, the communication unit may be a communication interface or a transceiver, or an input/output interface of a communication chip or system on chip. The processing unit may be one or more processors.

It should be understood that, the terminal device 400 according to the embodiment of this disclosure may correspond to the terminal device in the first to fifth embodiments. The above and other operations and/or functions of each unit in the terminal device 400 are used for respectively implementing corresponding flows in the terminal device in the first to fifth embodiments. For the sake of brevity, details are not described herein again.

Figure 5:
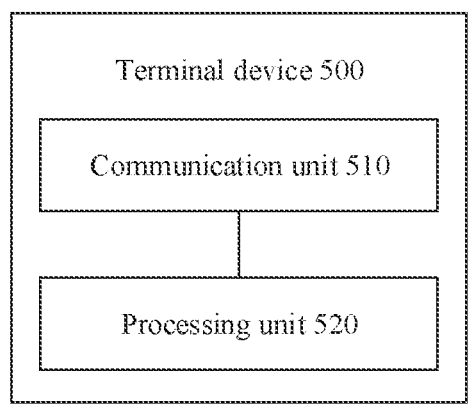
FIG. 5 is a schematic block diagram of a terminal device 500 according to an embodiment of this disclosure.

FIG. 5 is a schematic block diagram of a terminal device 500 according to an embodiment of this disclosure. As shown in FIG. 5, the terminal device 500 includes a communication unit and a processing unit.

The communication unit 510 is configured to receive indication information. The indication information is an ACK/NACK indication for at least one HARQ process. The HARQ process is an HARQ process corresponding to a first resource or an HARQ process shared by the first resource and a second resource. The first resource and the second resource have different configuration modes.

The processing unit 520 is configured to process or not process data transmission on the second resource according to the indication information, and/or the terminal device processes data transmission on the first resource according to the indication information.

Optionally, both the first resource and the second resource are resources in an unlicensed spectrum.

Optionally, both the first resource and the second resource are CG resources.

Optionally, the processing unit 520 is at least configured to: not process data transmission on the second resource or ignore the indication information in response to that the first HARQ process corresponds to the second resource; and in response to that the first HARQ process corresponds to the second resource and the first resource, process or not process, according to the indication information, data transmission on the second resource in a data transmission mode on the third resource which is used prior to receiving the indication information.

Optionally, the third resource is a resource, a time of data transmission on which before the indication information is received is closest to a time for receiving the indication information.

Optionally, the processing unit 520 is at least configured to: process, according to the indication information, data transmission on the first resource in accordance with the third transmission mechanism. The third transmission mechanism is a transmission mechanism of the first resource.

Optionally, the processing unit 520 is at least configured to: transmit the data on the first resource according to the third transmission mechanism in response to that the indication information includes a NACK indication of a second HARQ process corresponding to the first resource; and not transmit the data on the first resource in response to that the indication information includes an ACK indication of the second HARQ process.

Optionally, the processing unit 520 is at least configured to: transmit the data on the first resource according to the third transmission mechanism in response to that the indication information includes the NACK indication of a plurality of HARQ processes, the plurality of HARQ processes include the second HARQ process, and the first resource is a resource, on which data transmission is performed, determined according to a priority rule in resources corresponding to the plurality of HARQ processes; and not transmit the data on the first resource in response to that the indication information comprises the ACK indication of the first resource.

Optionally, the processing unit 520 is at least configured to: transmit data on the first resource according to the third transmission mechanism in response to that the indication information includes the NACK indication of the plurality of HARQ processes, the plurality of HARQ processes include the second HARQ process, and a PDU on the first resource is a PDU, on which data transmission is performed, determined according to a priority rule among PDUs on resources corresponding to the plurality of HARQ processes; and not transmit the data on the first resource in response to that the indication information includes the ACK indication of the second HARQ process.

Optionally, the processing unit 520 is at least configured to: transmit the data on the first resource according to the third transmission mechanism in response to that the indication information includes the NACK indication of a plurality of HARQ processes, and any one of the plurality of HARQ processes is selected as the second HARQ process; and not transmit the data on the first resource in response to that the indication information includes the ACK indication of the second HARQ process.

Optionally, the processing unit 520 is configured to: transmit the data on the first resource on a seventh resource followed after the indication information is received.

Optionally, the seventh resource is a resource, a time of data transmission on which after the indication information is received is closest to the time for receiving the indication information.

Optionally, the seventh resource shares the first HARQ process with the first resource and has the same or different configuration from the first resource. Alternatively, the seventh resource has a different configuration from the first resource.

Optionally, in some embodiments, the communication unit may be a communication interface or a transceiver, or an input/output interface of a communication chip or system on chip. The processing unit may be one or more processors.

It should be understood that, the terminal device 500 according to the embodiment of this disclosure may correspond to the terminal device in the sixth embodiment, the second embodiment, and the third embodiment. The above and other operations and/or functions of each unit in the terminal device 500 are used for respectively implementing corresponding flows in the terminal device in the sixth embodiment, the second embodiment, and the third embodiment. For the sake of brevity, details are not described herein again.

Figure 6:
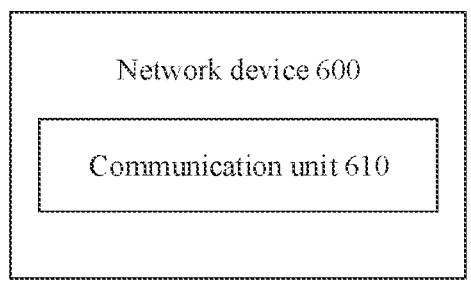
FIG. 6 is a schematic block diagram of a network device 600 according to an embodiment of this disclosure.

FIG. 6 is a schematic block diagram of a network device 600 according to an embodiment of this disclosure. As shown in FIG. 6, the network device 600 includes a communication unit 610. The communication unit is configured to send indication information. The indication information is an ACK/NACK indication of at least one HARQ process. The HARQ process is an HARQ process corresponding to a first resource and/or a second resource. The first resource and the second resource have different configuration modes.

Optionally, both the first resource and the second resource are resources in an unlicensed spectrum.

Optionally, both the first resource and the second resource are CG resources.

Optionally, in some embodiments, the communication unit may be a communication interface or a transceiver, or an input/output interface of a communication chip or system on chip. The processing unit may be one or more processors.

It should be understood that, the network device 600 according to the embodiment of this disclosure may correspond to the network device in the first to fifth embodiments of this disclosure. The above and other operations and/or functions of each unit in the network device 600 are used for respectively implementing corresponding flows in the network device in the first to fifth embodiments. For the sake of brevity, details are not described herein again.

Figure 7:
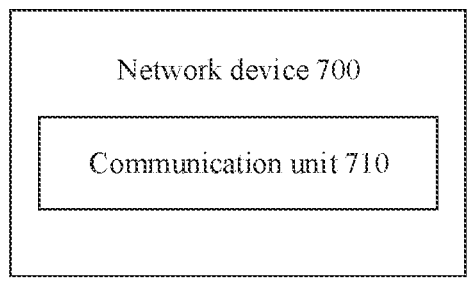
FIG. 7 is a schematic block diagram of a network device 700 according to an embodiment of this disclosure.

FIG. 7 is a schematic block diagram of a network device 700 according to an embodiment of this disclosure. As shown in FIG. 7, the network device 700 includes a communication unit 710. The communication unit is configured to send indication information. The indication information is an ACK/NACK indication for at least one HARQ process. The HARQ process is an HARQ process corresponding to a first resource or an HARQ process shared by the first resource and a second resource. The first resource and the second resource have different configuration modes.

Optionally, both the first resource and the second resource are resources in an unlicensed spectrum.

Optionally, both the first resource and the second resource are CG resources.

Optionally, in some embodiments, the communication unit may be a communication interface or a transceiver, or an input/output interface of a communication chip or system on chip. The processing unit may be one or more processors.

It should be understood that, the network device 700 according to the embodiment of this disclosure may correspond to the network device in the sixth embodiment, the second embodiment, and the third embodiment of this disclosure. The above and other operations and/or functions of each unit in the network device 700 are used for respectively implementing corresponding flows in the network device in the sixth embodiment, the second embodiment, and the third embodiment. For the sake of brevity, details are not described herein again.

Figure 8:
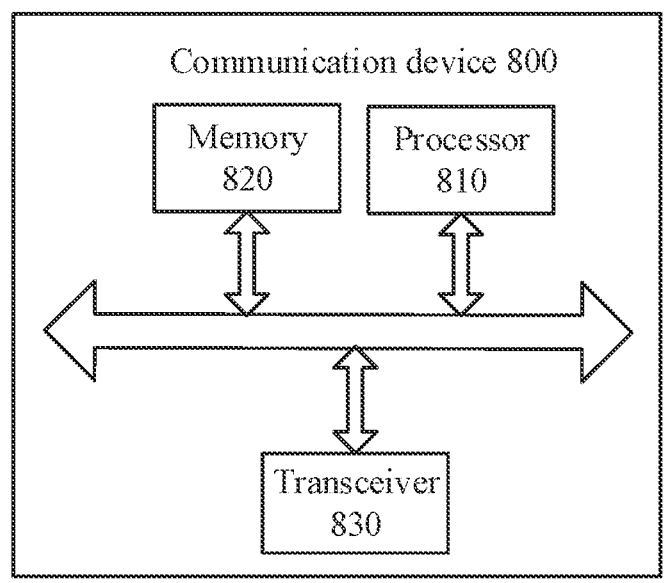
FIG. 8 is a schematic structural diagram of a communication device 800 according to an embodiment of this disclosure.

FIG. 8 is a schematic structural diagram of a communication device 800 according to an embodiment of this disclosure. The communication device 800 shown in FIG. 8 includes a processor 810. The processor 810 may call and run a computer program in a memory, so as to implement the method in the embodiments of this disclosure.

Optionally, as shown in FIG. 8, the communication device 800 may further include a memory 820. The processor 810 may invoke and run a computer program in the memory 820 to implement the method in the embodiments of this disclosure.

The memory 820 may be an independent device independent of the processor 810 and may also be integrated into the processor 810.

Optionally, as shown in FIG. 8, the communication device 800 may further include a transceiver 830. The processor 810 may control the transceiver 830 to communicate with another device. Specifically, the processor 810 transmits information or data to another device or receives information or data transmitted by another device.

The transceiver 830 may include a transmitter and a receiver. The transceiver 830 may further include one or more antennas.

Optionally, the communication device 800 may be a network device in this embodiment of this disclosure. The communication device 800 may implement corresponding flows implemented by the network device in each method of the embodiments of this disclosure. For simplicity, elaborations are omitted herein.

Optionally, the communication device 800 may be a terminal device in the embodiments of this disclosure. The communication device 800 may implement corresponding flows implemented by the terminal device in each method of the embodiments of this disclosure. For simplicity, elaborations are omitted herein.

Figure 9:
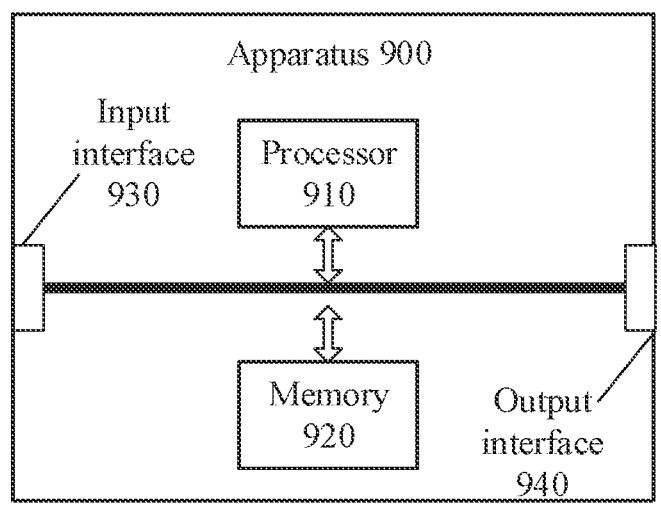
FIG. 9 is a schematic structural diagram of an apparatus according to an embodiment of this disclosure.

FIG. 9 is a schematic structural diagram of an apparatus according to an embodiment of this disclosure. The apparatus 900 shown in FIG. 9 includes a processor 910. The processor 910 may invoke and run a computer program in a memory to implement the method in the embodiments of this disclosure.

Optionally, as shown in FIG. 9, the apparatus 900 may further include a memory 920. The processor 910 may invoke and run the computer program in the memory 920 to implement the method in the embodiments of this disclosure.

The memory 920 may be an independent device independent of the processor 910 and may also be integrated into the processor 910.

Optionally, the apparatus 900 may further include an input interface 930. The processor 910 may control the input interface 930 to communicate with another device or chip. Specifically, the processor 910 acquires information or data transmitted by another device or chip.

Optionally, the apparatus 900 may further include an output interface 940. The processor 910 may control the output interface 940 to communicate with another device or chip, Specifically, the processor 910 may control the output interface 940 to output information or data transmitted by another device or chip.

Optionally, the apparatus is applicable to the network device in the embodiments of this disclosure, and the apparatus may implement corresponding flows implemented by the network device in each method of the embodiments of this disclosure. For simplicity, elaborations are omitted herein.

Optionally, the apparatus is applicable to the terminal device in the embodiments of this disclosure, and the apparatus may implement corresponding flows implemented by the terminal device in each method of the embodiments of this disclosure. For simplicity, elaborations are omitted herein.

Optionally, the apparatus provided in the embodiments of this disclosure may also be a chip, for example, a system-level chip, a system chip, a chip system, or a system on chip.

Figure 10:
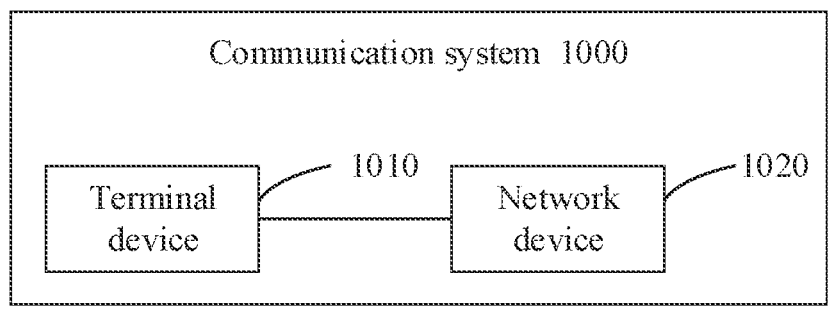
FIG. 10 is a schematic block diagram of a communication system 1000 according to an embodiment of this disclosure.

FIG. 10 is a schematic block diagram of a communication system 1000 according to an embodiment of this disclosure. As shown in FIG. 10, the communication system 1000 includes a terminal device 1010 and a network device 1020.

The terminal device 1010 may be configured to implement corresponding functions implemented by the terminal device in the above methods. The network device 1020 may be configured to implement the corresponding functions implemented by the network device or the base station in the above methods. For simplicity, elaborations are omitted herein.

It is to be understood that the processor in the embodiment of this disclosure may be an integrated circuit chip having a signal processing capacity. During implementation, each operation of the method embodiments may be completed by an integrated logical circuit of hardware in the processor or an instruction in a software form. The above processor may be a general processor, a Digital Signal Processor (DSP), an Application Specific Integrated Circuit (ASIC), a Field-Programmable Gate Array (FPGA) or other programmable logic devices, discrete gate or transistor logic devices, and discrete hardware components. Each method, operation and logical block diagram disclosed in the embodiments of the present disclosure may be implemented or executed. The general processors may be microprocessors or the processor may also be any conventional processors. The operations in combination with the method disclosed in the embodiments of the present disclosure may be directly executed and implemented by a hardware decoding processor, or may be performed by a combination of hardware and software modules in the decoding processor. The software module may be arranged in a mature storage medium in the field such as a Random Access Memory (RAM), a flash memory, a Read-Only Memory (ROM), a Programmable ROM (PROM) or Electrically Erasable PROM (EEPROM), and a register. The storage medium is arranged in a memory, and the processor reads information in the memory, and implements the operations of the method in combination with hardware.

It is to be understood that the memory in the embodiment of this disclosure may be a volatile memory or a non-volatile memory, or may include both the volatile and non-volatile memories. The non-volatile memory may be an ROM, a PROM, an Erasable PROM (EPROM), an EEPROM or a flash memory. The volatile memory may be an RAM, and is used as an external high-speed cache. It is exemplarily but unlimitedly described that RAMs in various forms may be available/effective, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that, the above memory is exemplarily but unlimitedly described. For example, the memory in the embodiments of this disclosure may further be as SRAM, a DRAM, an SDRAM, a DDR SDRAM, an ESDRAM, an SLDRAM, and a DR RAM. That is to say, the memory in the embodiments of this disclosure is intended to include, but not limited to, memories of these and any other proper types.

An embodiment of this disclosure further provides a computer-readable storage medium, configured to store a computer program.

Optionally, the computer-readable storage medium is applicable to a network device or a base station in the embodiments of this disclosure, and the computer program causes a computer to execute corresponding flows implemented by the network device or a base station in each method of the embodiments of this disclosure. For simplicity, elaborations are omitted herein.

Optionally, the computer-readable storage medium is applicable to a mobile terminal/terminal device in the embodiments of this disclosure, and the computer program causes a computer to execute corresponding flows implemented by the mobile terminal/terminal device in each method of the embodiments of this disclosure. For simplicity, elaborations are omitted herein.

An embodiment of this disclosure further provides a computer program product, including a computer program instruction.

Optionally, the computer program product is applicable to a network device or a base station in the embodiments of this disclosure, and the computer program instruction causes a computer to execute corresponding flows implemented by the network device or a base station in each method of the embodiments of this disclosure. For simplicity, elaborations are omitted herein.

Optionally, the computer program product is applicable to a mobile terminal/terminal device in the embodiments of this disclosure, and the computer program instruction causes a computer to execute corresponding flows implemented by the mobile terminal/terminal device in each method of the embodiments of this disclosure. For simplicity, elaborations are omitted herein.

An embodiment of this disclosure further provides a computer program.

Optionally, the computer program is applicable to a network device or a base station in the embodiments of this disclosure. The computer program, when run on a computer, cases the computer to execute corresponding flows implemented by the network device or a base station in each method of the embodiments of this disclosure. For simplicity, elaborations are omitted herein.

Optionally, the computer program is applicable to a mobile terminal/terminal device in the embodiments of this disclosure. The computer program, when run on a computer, causes the computer to execute corresponding flows implemented by the mobile terminal/terminal device in each method of the embodiments of this disclosure. For simplicity, elaborations are omitted herein.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. The professionals may realize the described functions for each specific application by using different methods, but such implementation shall fall within the scope of this disclosure.

Those skilled in the art may clearly learn about that regarding operation processes of the system, device, and units described above, reference may be made to the corresponding processes in the above method embodiments, which will not be elaborated herein for ease and briefness of description.

In several embodiments provided by this disclosure, it is to be understood that the disclosed system, apparatus and method may be implemented in other ways. For example, the device embodiment described above is only schematic, and for example, division of the units is only logic function division, and other division manners may be adopted during practical implementation. For another example, a plurality of units or components may be combined or integrated into another system, or some characteristics may be neglected or not executed. In addition, the displayed or discussed mutual coupling or direct coupling or communication connection may be indirect coupling or communication connection through some interfaces, devices or units, and may be in electrical, mechanical or other forms.

The units described as separate components may or may not be physically separated. The components displayed as units may or may not be physical units, that is, the components may be arranged in one place, or may be distributed on the plurality of network units. A part or all of the units may be selected according to actual requirements to achieve the purposes of the solutions of this embodiment.

In addition, the functional units in the various embodiments of this disclosure may be integrated into one processing unit, or each unit may exist alone physically, or two or more than two units may be integrated into one unit.

If the function is implemented in the form of the software functional unit and sold or used as an independent product, the function can be stored in the computer readable storage medium. Based on this understanding, the essential part in the technical solutions of this disclosure or the parts in the technical solutions of this disclosure that contribute to the prior art, or part of the technical solutions can be embodied in the form of a software product. The computer software product is stored in a storage medium, including a plurality of instructions for causing a computer device (which may be a personal computer, a server, or a network device, and the like) to execute all or part of the operations of the method described in the various embodiments of this disclosure. The above storage medium includes various media capable of storing program codes such as a U disk, a mobile Hard Disk Drive (HDD), a Read-Only Memory (ROM), a Random Access Memory (RAM), a magnetic disk or an optical disk.

The foregoing is only the specific implementations of the present disclosure and not intended to limit the scope of protection of the present disclosure. Any variations or replacements apparent to those skilled in the art within the technical scope disclosed by the present disclosure shall fall within the scope of protection of the present disclosure. Therefore, the protection scope of this disclosure shall be subject to the protection scope of the claims.

The invention claimed is:

1. A wireless communication method, comprising:
   receiving, by a terminal device, indication information, wherein the indication information comprises an acknowledgement (ACK)/non-acknowledgement (NACK) indication of a plurality of Hybrid Automatic Repeat Request (HARQ) processes, the indication information comprises a downlink feedback indicator (DFI), the plurality of HAR Q processes comprise an HARQ process corresponding to a second resource; and
   processing, by the terminal device, data transmission on the second resource according to the indication information,
   wherein the second resource is a pre-Configured Grant (CG) resource, and
   wherein the processing, by the terminal device, data transmission on the second resource according to the indication information comprises:
   in response to that a first HARQ process corresponds to the second resource, processing, by the terminal device according to the indication information, data transmission on the second resource in accordance with a first transmission mechanism, which comprises:
      automatically retransmitting, by the terminal device, data on the second resource according to the first transmission mechanism, in response to that the indication information comprises NACK indications of the plurality of HARQ processes, the plurality of HARQ processes comprise the first HARQ process, and a Packet Data Unit (PDU) on the second resource is a PDU, on which data transmission is to be performed, determined according to a priority rule among PDUs on resources corresponding to the plurality of HARQ processes,
   wherein the priority rule is determined according to a priority of logic channels in the PDUs, and the first transmission mechanism is automatic transmission of data performed by using the same HARQ process as the second resource and a CG resource in the same configuration as the second resource.

2. The method of claim 1, wherein the second resource is a resource in an unlicensed spectrum.

3. The method of claim 1, wherein the processing, by the terminal device, data transmission on the second resource according to the indication information comprises:
   in response to that a first HARQ process corresponds to the second resource, processing, by the terminal device according to the indication information, data transmission on the second resource in accordance with a second transmission mechanism, wherein the first transmission mechanism is an automatic transmission mechanism of the second resource, and the second transmission mechanism is an enhanced automatic transmission mechanism of the second resource.

4. The method of claim 3, wherein the processing, by the terminal device according to the indication information, data transmission on the second resource in accordance with a second transmission mechanism comprises at least one of following operations:
   transmitting, by the terminal device, data on the second resource according to the second transmission mechanism, in response to that the indication information comprises NACK indications of a plurality of HARQ processes, the plurality of HARQ processes comprise the first HARQ process, and a Packet Data Unit (PDU) on the second resource is a PDU, on which data transmission is performed, determined according to a priority rule among PDUs on resources corresponding to the plurality of HARQ processes; or
   not transmitting, by the terminal device, the data on the second resource in response to that the indication information comprises an ACK indication of the first HARQ process.

5. The method of claim 4, wherein the transmitting, by the terminal device, data on the second resource according to the second transmission mechanism comprises:
   transmitting, by the terminal device, data on the second resource by using at least one of a HARQ process different from the first HARQ process or a fifth resource having a configuration different from the second resource.

6. The method of claim 5, wherein the fifth resource is a resource, a time of data transmission on which after the indication information is received is closest to a time for receiving the indication information, among resources which at least correspond to a different HARQ process from the second resource or have a different configuration from the second resource.

7. The method of claim 3, wherein the second transmission mechanism is automatic transmission of data performed by using at least one of a different HARQ process from the second resource or a CG resource in a different configuration from the second resource.

8. A terminal device, comprising a processor, a memory and a transceiver, wherein the memory is configured to store a computer program, and the processor is configured to call and run the computer program stored in the memory, to execute:
   controlling the transceiver to receive indication information, wherein the indication information comprises an acknowledgement (ACK)/non-acknowledgement (NACK) indication of a plurality of Hybrid Automatic Repeat Request (HARQ) processes, the indication information comprises a downlink feedback indicator (DFI), the plurality of HARQ processes comprise an HARQ process corresponding to a second resource; and
   processing data transmission on the second resource according to the indication information,
   wherein the second resource is a pre-Configured Grant (CG) resource, and
   wherein the processor is configured to call and run the computer program stored in the memory, to execute:

in response to that a first HARQ process corresponds to the second resource, processing, according to the indication information, data transmission on the second resource in accordance with a first transmission mechanism, which comprises:
controlling the transceiver to automatically retransmit data on the second resource according to the first transmission mechanism, in response to that the indication information comprises NACK indications of the plurality of HARQ processes, the plurality of HARQ processes comprise the first HARQ process, and a Packet Data Unit (PDU) on the second resource is a PDU, on which data transmission is to be performed, determined according to a priority rule among PDUs on resources corresponding to the plurality of HARQ processes,
wherein the priority rule is determined according to a priority of logic channels in the PDUs, and the first transmission mechanism is automatic transmission of data performed by using the same HARQ process as the second resource and a CG resource in the same configuration as the second resource.

9. The terminal device of claim 8, wherein the second resource is a resource in an unlicensed spectrum.

10. The terminal device of claim 8, wherein the processor is configured to call and run the computer program stored in the memory, to execute:
in response to that a first HARQ process corresponds to the second resource, processing, according to the indication information, data transmission on the second resource in accordance with a second transmission mechanism, wherein the first transmission mechanism is an automatic transmission mechanism of the second resource, and the second transmission mechanism is an enhanced automatic transmission mechanism of the second resource.

11. The terminal device of claim 10, wherein the processor is configured to call and run the computer program stored in the memory, to execute:
controlling the transceiver to transmit data on the second resource according to the second transmission mechanism, in response to that the indication information comprises NACK indications of a plurality of HARQ processes, the plurality of HARQ processes comprise the first HARQ process, and a Packet Data Unit (PDU) on the second resource is a PDU, on which data transmission is performed, determined according to a priority rule among PDUs on resources corresponding to the plurality of HARQ processes; or
controlling the transceiver to not transmit the data on the second resource in response to that the indication information comprises an ACK indication of the first HARQ process.

12. The terminal device of claim 11, wherein the processor is configured to call and run the computer program stored in the memory, to execute:
controlling the transceiver to transmit data on the second resource by using at least one of a HARQ process different from the first HARQ process or a fifth resource having a configuration different from the second resource.

13. The terminal device of claim 10, wherein the second transmission mechanism is automatic transmission of data performed by using at least one of a different HARQ process from the second resource or a CG resource in a different configuration from the second resource.

14. A network device, comprising a processor, a transceiver and a memory, wherein the memory is configured to store a computer program, and the processor is configured to call and run the computer program stored in the memory, to execute:
controlling the transceiver to send indication information to a terminal device, wherein the indication information comprises an acknowledgement (ACK)/non-acknowledgement (NACK) indication of a plurality of Hybrid Automatic Repeat Request (HARQ) processes, the indication information comprises a downlink feedback indicator (DFI), the plurality of HARQ processes comprise an HARQ process corresponding to a second resource,
wherein the indication information is used by the terminal device for processing data transmission on the second resource according to the indication information,
wherein the second resource is a pre-Configured Grant (CG) resource, and
wherein the indication information is used by the terminal device to:
in response to that a first HARQ process corresponds to the second resource, process data transmission on the second resource in accordance with a first transmission mechanism, which comprises:
automatically retransmitting data on the second resource according to the first transmission mechanism, in response to that the indication information comprises NACK indications of the plurality of HARQ processes, the plurality of HARQ processes comprise the first HARQ process, and a Packet Data Unit (PDU) on the second resource is a PDU, on which data transmission is to be performed, determined according to a priority rule among PDUs on resources corresponding to the plurality of HARQ processes,
wherein the priority rule is determined according to a priority of logic channels in the PDUs, and the first transmission mechanism is automatic transmission of data performed by using the same HARQ process as the second resource and a CG resource in the same configuration as the second resource.

15. The network device of claim 14, wherein the second resource is a resource in an unlicensed spectrum.

16. The network device of claim 14, wherein
in response to that a first HARQ process corresponds to the second resource, the terminal device processes, according to the indication information, data transmission on the second resource in accordance with a second transmission mechanism, wherein the first transmission mechanism is an automatic transmission mechanism of the second resource, and the second transmission mechanism is an enhanced automatic transmission mechanism of the second resource.

17. The network device of claim 16, wherein
the terminal device transmits data on the second resource according to the second transmission mechanism, in response to that the indication information comprises NACK indications of a plurality of HARQ processes, the plurality of HARQ processes comprise the first HARQ process, and a Packet Data Unit (PDU) on the second resource is a PDU, on which data transmission is performed, determined according to a priority rule among PDUs on resources corresponding to the plurality of HARQ processes; or the terminal device does not transmit the data on the second resource in response to that the indication information comprises an ACK indication of the first HARQ process.

18. The network device of claim 17, wherein the terminal device transmits data on the second resource by using at least one of a HARQ process different from the first HARQ process or a fifth resource having a configuration different from the second resource.

19. The network device of claim 16, wherein the second transmission mechanism is automatic transmission of data performed by using at least one of a different HARQ process from the second resource or a CG resource in a different configuration from the second resource.

* * * * *